(12) United States Patent
Koda et al.

(10) Patent No.: US 11,662,689 B2
(45) Date of Patent: May 30, 2023

(54) HOLOGRAM, DETECTION DEVICE, AND METHOD FOR VERIFYING AUTHENTICITY OF HOLOGRAM

(71) Applicant: TOPPAN PRINTING CO., LTD., Tokyo (JP)

(72) Inventors: Soko Koda, Tokyo (JP); Akihito Kagotani, Tokyo (JP); Tomoyuki Shirasaki, Tokyo (JP); Noriko Harashima, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 438 days.

(21) Appl. No.: 16/938,204

(22) Filed: Jul. 24, 2020

(65) Prior Publication Data

US 2020/0356048 A1    Nov. 12, 2020

Related U.S. Application Data

(63) Continuation of application No. PCT/JP2019/004759, filed on Feb. 8, 2019.

(30) Foreign Application Priority Data

Feb. 8, 2018   (JP) .............................. JP2018-021399

(51) Int. Cl.
*G03H 1/00* (2006.01)
*G02B 5/32* (2006.01)
(Continued)

(52) U.S. Cl.
CPC .............. *G03H 1/0011* (2013.01); *G02B 5/32* (2013.01); *G03H 1/0252* (2013.01); *G03H 1/08* (2013.01);
(Continued)

(58) Field of Classification Search
None
See application file for complete search history.

(56) References Cited

U.S. PATENT DOCUMENTS 5,623,347 A    4/1997   Pizzanelli
5,956,164 A    9/1999   Waitts
(Continued)

FOREIGN PATENT DOCUMENTS

JP    2005-077558 A    3/2005
JP    2007-179434 A    7/2007
(Continued)

OTHER PUBLICATIONS

Extended European Search Report dated Jun. 6, 2021 for corresponding European Patent Application No. 19751323.7.
(Continued)

*Primary Examiner* — Jennifer D. Carruth
(74) *Attorney, Agent, or Firm* — Foley & Lardner LLP

(57) ABSTRACT

A hologram that includes a formation layer and a reflection layer that are laminated. The formation layer has an optical phase modulation structure on a first interface in contact with the reflection layer. When reference light emitted from a point light source enters through a second interface different from the first interface of the formation layer, the entirety or part of an image to be reconstructed by the optical phase modulation structure is reconstructed as spatial information on the point light source side relative to the second interface.

17 Claims, 12 Drawing Sheets

(51) Int. Cl.
  G03H 1/02    (2006.01)
  G03H 1/08    (2006.01)
  G03H 1/22    (2006.01)

(52) U.S. Cl.
  CPC ... *G03H 1/2286* (2013.01); *G03H 2001/2244* (2013.01); *G03H 2225/32* (2013.01); *G03H 2250/42* (2013.01)

(56) References Cited

U.S. PATENT DOCUMENTS

| | | | |
|---|---|---|---|
| 2005/0225816 A1 | 10/2005 | Kitamura et al. | |
| 2007/0147215 A1* | 6/2007 | Sakaguchi | G11B 7/0065 |
| 2009/0316237 A1* | 12/2009 | Uno | G11B 7/1398 359/1 |

FOREIGN PATENT DOCUMENTS

| | | | | |
|---|---|---|---|---|
| JP | | 3951686 B2 | 8/2007 | |
| JP | WO2007000800 A1 * | | 1/2009 | ........... G11B 7/0065 |
| JP | | 4256372 B2 | 4/2009 | |
| JP | | 4677683 B2 | 4/2011 | |
| JP | | 2017-195520 A | 10/2017 | |
| WO | WO-2017/090652 A1 | | 6/2017 | |
| WO | WO-2017/209113 A1 | | 12/2017 | |

OTHER PUBLICATIONS

International Searching Authority, "International Search Report," issued in connection with International Patent Application No. PCT/JP2019/004759, dated Apr. 23, 2019.

International Searching Authority, "Written Opinion," issued in connection with International Patent Application No. PCT/JP2019/004759, dated Apr. 23, 2019.

Partial Supplementary European Search Report dated Feb. 25, 2021 for corresponding European Patent Application No. 19751323.7.

* cited by examiner

HOLOGRAM, DETECTION DEVICE, AND METHOD FOR VERIFYING AUTHENTICITY OF HOLOGRAM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/004759, filed on Feb. 8, 2019, which is based upon and claims the benefit of priority to Japanese Patent Application No. 2018-021399, filed on Feb. 8, 2018, the disclosures of which are all incorporated herein by reference in their entireties.

TECHNICAL FIELD

The present disclosure relates to a hologram, a detection device, and a method for verifying authenticity of a hologram.

BACKGROUND

According to the existing hologram techniques, a light source having a coherence length such as a laser is used to cause reference light and object light to interfere with each other, and a resultant interference fringe is recorded on a photoreactive polymer or the like, thereby recording optical phase information and intensity information of the object light. The object light can be reconstructed by emitting the reference light into the recorded photopolymer.

There are optical films and the like that are structurally controlled based on optical interference computed by a computer, which are called computer-generated holograms or the like. The object light can also be reconstructed by these computer-generated holograms.

Especially for computer-generated holograms, PTL 1 already discloses that the intensity of interference waves of reference light and object light is computed by a computer to produce an interference fringe.

There have also been disclosed a technique by which to produce actually such a hologram for use in a display (PTL 2) and a technique by which to read reconstructed information from a hologram to perform authenticity verification (PTL 3).

CITATION LIST

Patent Literatures

PTL 1: JP 4256372 B2;
PTL 2: JP 3951686 B2;
PTL 3: JP 4677683 B2.

SUMMARY OF THE INVENTION

Technical Problem

As described above, there are disclosed methods for performing authenticity verification by visual inspection of reconstructed information from a hologram or via a reading device or the like. However, in the case of performing authenticity verification on a hologram using a reading device, after the visual inspection, the reconstructed information in an authentic article can be imitated and read by the reading device. Thus, the authenticity verification become ambiguous according to this method.

Three-dimensional spatial information in the reconstructed information from a hologram can be visually checked. However, such three-dimensional spatial information in the reconstructed information is hard to collectively acquire by a reading device or the like which can acquire two-dimensional information.

The present invention has been devised in view of the foregoing circumstances. An object of the present invention is to provide a hologram that allows easier acquisition of three-dimensional spatial distribution information in reconstructed information, a detection device, and a method for verifying authenticity of a hologram.

Solution to Problem

A first aspect of the present disclosure is a hologram that includes a formation layer and a reflection layer that are laminated. The formation layer has an optical phase modulation structure on a first interface in contact with the reflection layer. When reference light emitted from a point light source enters through a second interface different from the first interface of the formation layer, the entirety or part of an image to be reconstructed by the optical phase modulation structure is reconstructed as first information on the point light source side relative to the second interface.

This makes it possible to acquire part of the first information using a detection device described later, and further acquire three-dimensional spatial distribution information from the first information.

According to a second aspect of the present disclosure, in the hologram of the first aspect, when the reference light emitted from the point light source enters through the second interface, part of the image to be reconstructed by the optical phase modulation structure is reconstructed as second information on a side opposite to that side of the second interface facing the point light source.

This makes it possible to add a plurality of pieces of information to the hologram. This also makes it easier to separate information obtained by visual observation of the hologram and information obtained by the detection device described later.

According to a third aspect of the present disclosure, in the hologram of the first or second aspect, the first information is reconstructed on a first surface positioned on the point light source side of the second interface, and when the reference light emitted from the point light source enters through the second interface, part of the image to be reconstructed by the optical phase modulation structure is reconstructed as third information on the point light source side of the second interface and on a second surface that is different from the first surface and is in proximity to the first surface.

This makes it possible to add a plurality of pieces of information to the hologram. This also makes it easier to separate information obtained by visual observation of the hologram and information obtained by the detection device described later.

According to a fourth aspect of the present disclosure, in the hologram of the first or second aspect, the image to be reconstructed by the optical phase modulation structure is reconstructed from a plurality of pieces of point information that constitutes dot-like images, and the point information is each positioned at a predetermined distance from the second interface.

According to a fifth aspect of the present disclosure, in the hologram of the third aspect, the image to be reconstructed by the optical phase modulation structure is reconstructed from a plurality of pieces of point information that constitutes dot-like images, and the point information is each positioned at a predetermined distance from the second interface.

This makes it possible to add a three-dimensional appearance to the first information, the second information, and the third information for the visual observation of the hologram, and makes it easier to separate the information obtained by the visual observation from the information obtained by the detection device described later.

According to a sixth aspect of the present disclosure, in the hologram of the fifth aspect, there is an overlap between horizontal positions of all or some of the plurality of pieces of point information for reconstructing the first information relative to the second interface and horizontal positions of all or some of the plurality of pieces of point information for reconstructing the third information relative to the second interface.

This makes it possible to hide the third information behind the first information so that only the first information can be observed at the time of visual observation of the hologram. On the other hand, the detection device described later can acquire both the first information and the third information. Thus, the information obtained by the visual observation of the hologram can be made different from the information obtained via the detection device.

A seventh aspect of the present disclosure is a detection device that includes: an image sensor capable of measuring light intensity; and the point light source. The image sensor has a one-dimensional image sensor or a two-dimensional image sensor with pixels formed from photosensors. The detection device detects the first information reconstructed by the hologram according to any one of the first to sixth aspects.

An eighth aspect of the present disclosure is a detection device that includes: an image sensor capable of measuring light intensity; and the point light source. The image sensor has a one-dimensional image sensor or a two-dimensional image sensor with pixels formed from double-gate transistor photosensors. The detection device detects, using the image sensor, the first information reconstructed by the hologram according to any one of the first to sixth aspects.

This makes it possible to acquire and detect the first information or the third information in the hologram via the one-dimensional image sensor or the two-dimensional image sensor.

According to a ninth aspect of the present disclosure, in the detection device of the seventh or eighth aspect, the image sensor is the two-dimensional image sensor that has on a light-transmissive substrate the pixels formed from a double-gate thin film transistor photosensors with a light-transmissive gate electrode and a non-light-transmissive gate electrode, and the pixels are configured such that the light-transmissive gate electrodes are arranged on a front surface of the image sensor facing the hologram, and an insulating film, a semiconductor film, an insulating film, and the non-light-transmissive gate electrode are arranged in this order from a back surface of the image sensor.

This configuration makes it possible to implement a small-sized detection device in which a reference light source, a sensor, and a hologram are coaxially arranged in this order.

According to a tenth aspect of the present disclosure, in the detection device of the ninth aspect, the light-transmissive substrate is an insulating substrate formed of a thin glass plate.

This makes it possible to further miniaturize the detection device and laminate image sensors as described later.

According to an eleventh aspect of the present disclosure, in the detection device of the ninth aspect, the light-transmissive substrate is formed of a light-transmissive resin film.

This makes it possible to further miniaturize the detection device and laminate image sensors as described later.

According to a twelfth aspect of the present disclosure, in the detection device of any one of the ninth to eleventh aspects, an optical axis direction of the point light source and a normal direction of the two-dimensional image sensor with the pixels formed from the double-gate thin film transistor photosensors are coaxially positioned.

This configuration makes it possible to facilitate miniaturization of the detection device by coaxially arranging the point light source emitting the reference light, the two-dimensional image sensor, and the hologram in this order.

According to a thirteenth aspect of the present disclosure, in the detection device of any one of the ninth to twelfth aspects, the two or more two-dimensional image sensors are laminated.

This makes it possible to more accurately acquire spatial information in the first information and the third information obtained from the hologram by one measurement.

A fourteenth aspect of the present disclosure is a detection device that includes: an image sensor capable of measuring light intensity; and the point light source. The image sensor has a two-dimensional image sensor with pixels formed from double-gate transistor photosensors. The image sensor detects, using the image sensor, light intensity of the point information for reconstructing the first information or the third information reconstructed by the hologram in the fifth or sixth aspect, to thereby acquire positions of the point information along a normal direction of the two-dimensional image sensor.

This makes it possible to acquire, using the detection device, the information contained in the first information and the spatial distribution information of the individual positions along the normal direction, two of which are applicable to a method for verifying authenticity of a hologram as described later.

A fifteenth aspect of the present disclosure is a method for verifying authenticity of a hologram. The method includes: using a detection device that includes an image sensor capable of measuring light intensity and the point light source, the image sensor being formed from a one-dimensional image sensor or a two-dimensional image sensor having pixels formed from double-gate transistors photosensor and is configured to detect, by the image sensor, the first information reconstructed by the hologram in any one of the fourth to sixth aspects; acquiring position information of the point information in the first information; comparing the first information acquired by the detection device with fourth information used to design the phase modulation structure for reconstructing the first information; and determining whether the first information is correct.

This makes it possible to evaluate, using the detection device, whether the hologram is reconstructed as designed and apply the evaluation result to authenticity verification and the like.

A sixteenth aspect of the present disclosure is a method for verifying authenticity of a hologram, including: using the detection device in the eighth aspect; acquiring the third information reconstructed from the hologram in the fifth or sixth aspect; and detecting whether the third information is authentic to determine authenticity of the hologram.

This makes it possible to apply the detection device to verification of authenticity of a hologram.

A seventeenth aspect of the present disclosure is a method for verifying authenticity of a hologram, including: using the detection device in the eighth aspect; moving one or both of elevation/depression and azimuth of the image sensor at a specific angle; acquiring, by the image sensor, the first information or the third information reconstructed from the hologram in the third, fifth, or sixth aspect; computing, from information of the elevation/depression or azimuth, predicted information obtained by the image sensor based on fourth information used to design the phase modulation structure for reconstructing the first information; comparing the first information or the third information obtained by the image sensor with the predicted information; and detecting whether the information obtained by the image sensor is true or false to determine the authenticity of the hologram.

This makes it possible to apply the method using the detection device to verification of authenticity of a hologram.

Advantageous Effects of Invention

According to the aspects of the present invention described above, it is easier to acquire three-dimensional spatial distribution information in reconstructed information from a hologram.

DETAILED DESCRIPTION

Hereinafter, embodiments of the present invention will be described in detail with reference to the drawings. Components that exhibit identical or similar functions are denoted by the same reference signs throughout the drawings, and redundant description thereof is omitted. Embodiments of the present disclosure are a group of embodiments originated from a single invention from the background. Aspects of the present disclosure are a group of aspects of embodiments that are originated from the single invention. Configurations of the present disclosure can have the aspects of the present disclosure. Features of the present disclosure can be combined to form the configurations. Therefore, the features, configurations, aspects, and embodiments of the present disclosure can be combined with one another, and the combinations can perform synergistic functions and produce synergistic effects.

Figure 18A:
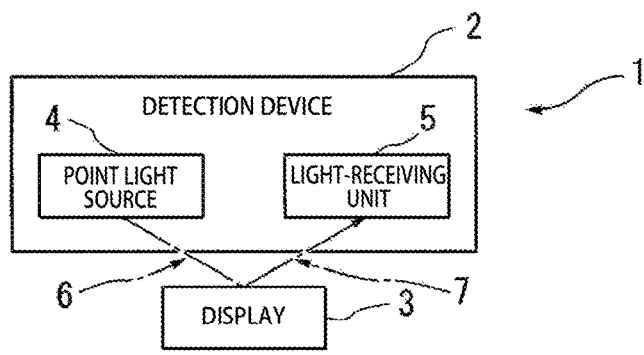
FIG. 18A is a block diagram describing an example of a basic configuration of a detection set according to an embodiment of the present invention.
Figure 18B:
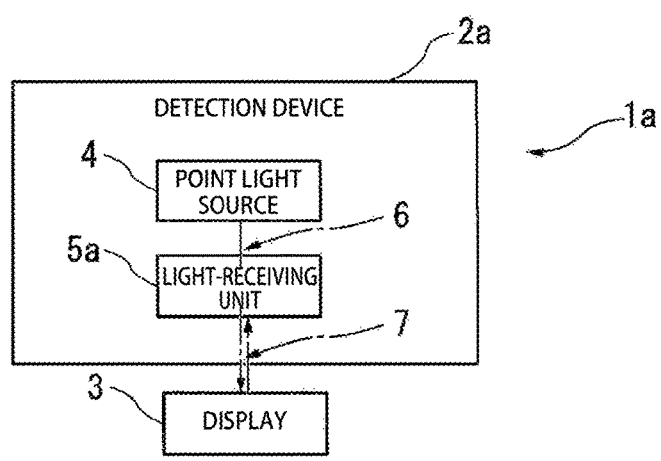
FIG. 18B is a block diagram describing an example of another basic configuration of a detection set according to an embodiment of the present invention.

First, referring to FIGS. 18A and 18B, basic configurations of detection sets according to embodiments of the present invention will be described. FIGS. 18A and 18B are diagrams describing the basic configurations of the detection sets according to the embodiments of the present invention.

The detection set 1 shown in FIG. 18A includes a detection device 2 and a hologram 3. The detection device 2 includes a point light source 4 and an image sensor 5. The detection device 2 emits reference light 6 from the point light source 4 into the hologram 3. The image sensor 5 receives light 7 of an image reconstructed by the hologram 3, converts the received light into an electric signal, and outputs the electric signal. On the other hand, a detection set 1a shown in FIG. 18B includes a detection device 2a and the hologram 3. The detection device 2a includes the point light source 4 and an image sensor 5a. The point light source 4 emits reference light 6 that passes through the image sensor 5a and enters the hologram 3. Then, the image sensor 5a receives the light 7 of an image reconstructed by the hologram 3, converts the received light into an electric signal, and outputs the electric signal. The detection set 1 or the detection set 1a according to the embodiments of the present disclosure can be configured as described above. Hereinafter, the hologram 3, the image sensor 5 or the image sensor 5a, and the detection device 2 or the detection device 2a will be described.

<Configuration of the Hologram>

Figure 1:
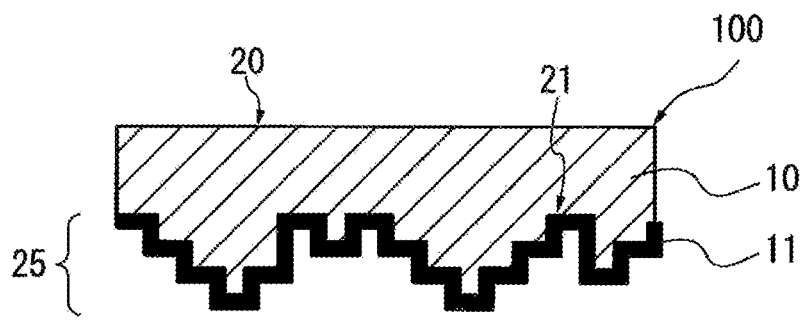
FIG. 1 is a partial cross-sectional view of a structure of a hologram in the present disclosure.
Figure 2:
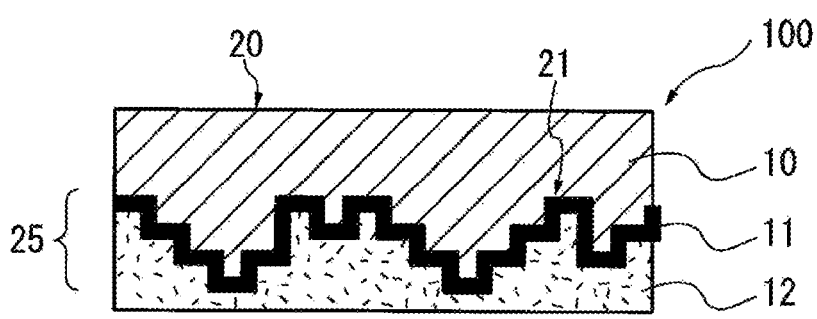
FIG. 2 is a partial cross-sectional view of another structure of the hologram in the present disclosure.

FIGS. 1 and 2 are partial cross-sectional views of instances of cross-section structures of a hologram according to an aspect of the present invention. The hologram 100 shown in FIGS. 1 and 2 corresponds to the hologram 3 shown in FIGS. 18A and 18B. As shown in FIG. 1, the hologram 100 according to the embodiment of the present invention can include a formation layer 10 and a reflection layer 11. The reflection layer 11 can cover the formation layer 10. An optical phase modulation structure 25 can be formed on an interface 21 between the formation layer 10 and the reflection layer 11. The hologram 100 according to the embodiment of the present invention shown in FIG. 2 has the reflection layer 11 like the hologram 100 shown in FIG. 1 and can further have an additive layer 12. That is, the hologram 100 shown in FIGS. 1 and 2 can be a hologram that includes the formation layer 10 and the reflection layer 11 laminated on each other. The formation layer 10 can have the optical phase modulation structure 25 on the interface 21 (first interface) in contact with the reflection layer 11. The interface 21 is a boundary surface between the formation layer 10 and the reflection layer 11. The formation layer 10 can be a layer that forms the optical phase modulation structure 25. The formation layer 10 may be a structure formation layer.

The formation material for the formation layer 10 can be a light-permeable polymer. The light-permeable polymer can be a thermoplastic resin, a thermal cross-linking resin, an ultraviolet cross-linking resin, or a thermoplastic ultraviolet cross-linking resin. Types of the polymer include acrylic resins such as a urethane-modified acrylic resin and an epoxy-modified acrylic resin, and an epoxy resin. The formation material for the formation layer 10 may be an inorganic material that transmits light, such as quartz, titanium oxide, or magnesium fluoride.

When the formation material for the formation layer 10 is a polymer, the formation layer 10 can be formed by applying the formation material to a substrate. The formation material can be applied to the substrate by gravure coating, die coating, lip coating, spin coating, dip coating, or spray coating. Otherwise, the formation layer 10 may be formed by a printing technique such as gravure printing or screen printing. Further, if the formation material is an organic material formable by evaporation such as a parylene, the formation layer 10 may be formed by evaporation.

When the formation material for the formation layer 10 is an inorganic material, the substrate can be coated with the formation material by dry coating techniques such as vacuum evaporation, sputtering, and atomic layer deposition, or wet coating techniques such as a sol-gel process.

The optical phase modulation structure 25 formed on the interface 21 can be a hologram. The hologram can be a relief hologram with a concave-convex structure on its surface. The optical phase modulation structure 25 may have a plurality of unit blocks arranged. The unit blocks each have a convex or concave cubic shape. Corresponding to the positions of the unit blocks 120, the phase of light from each reconstruction point 220 is calculated, and phase angles are calculated based on the phases and recorded on the corresponding unit blocks. The unit blocks can be arranged to have a length half or less the wavelength of light. The intervals between the unit blocks can be 10 nm or more to 400 nm. The length of one side of each unit block can be half or less the wavelength of the light. The length of one side of each unit block can be 10 nm or more to 400 nm. The height (depth) of each unit block can be about half the wavelength of the light in a medium when the optical phase modulation structure 25 is used for light reflection. The retardation of each unit block can be approximately equal to the wavelength of the light when the phase modulation structure 240 is used for light transmission. The height (depth) of each unit block can be 100 nm or more to 300 nm or less when the optical phase modulation structure 25 is used for light reflection, and can be 1 μm or more to 10 μm or less when the optical phase modulation structure 25 is used for light transmission. In either case, the height (depth) of each unit block can be 100 nm or more to 10 μm or less.

The hologram can be a Fourier transform hologram, a computer-generated hologram, or a kinoform. The optical phase modulation structure 25 can be the phase modulation structure described in WO 2017/150107. Otherwise, the optical phase modulation structure 25 may be projections and recesses in the phase angle recording layer 24 described in WO 2017/209113. The hologram can be a volume hologram in which the refractive index in the formation layer is modulated. The volume hologram can be a Lippmann hologram. The material for the volume hologram can be a photopolymer. The photopolymer can contain vinyl acetate, epoxy, acryl, or urethane. The volume hologram can be duplicated by a contact copying process using laser. These structures are formed such that an interference fringe formed by a designed reconstruction image (corresponding to, for example, first information 41 and second information 43 shown in FIG. 6) and reference light is computed and a structure to be formed on the interface 21 of the hologram 100 is computed from the interference fringe. In the present embodiment, the information used for designing the reconstruction image or designing the optical phase modulation structure 25 is called fourth information. The fourth information can be used for comparison with the reconstructed information from the hologram 3 acquired by the detection devices 2 and 2A shown in FIGS. 18A and 18B to determine the correctness of the reconstructed information (whether the hologram has been correctly produced).

The optical phase modulation structure 25 formed on the interface 21 has a multistep shape referring to FIGS. 1 and 2. The steps may be rounded. In addition, the optical phase modulation structure 25 may not have a multistep shape but may have a slope shape. The optical phase modulation structure 25 may not have a multistep shape but may have a binary shape. In either case, the optical phase modulation structure 25 is structured to reconstruct the reconstruction image on an interface 20 (second interface) different from the interface 21 in the hologram 100. This makes it easier to detect the reconstructed image described later. The interface 20 is a boundary surface between the formation layer 10 and a gas phase or vacuum or protective layer. The reference light from a point light source not shown may enter the interface 20.

Figure 3:
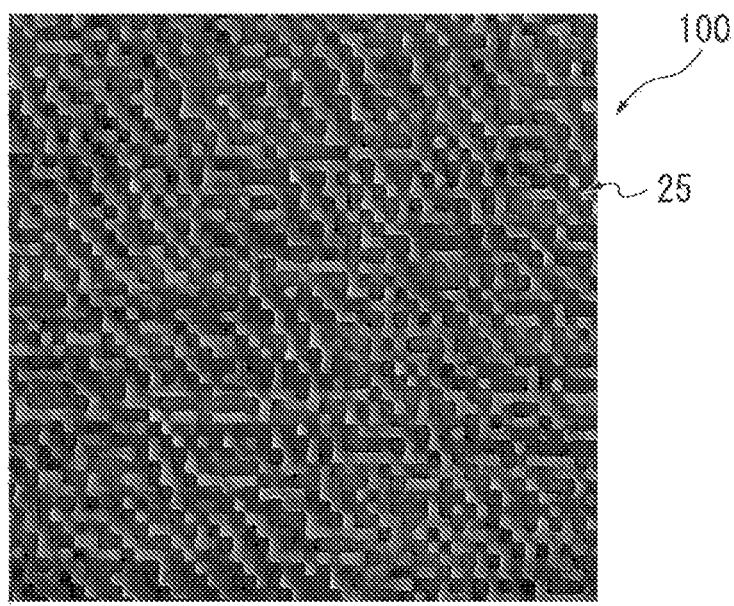
FIG. 3 is a partial plan view of an optical phase modulation structure where the hologram in the present disclosure is formed.

FIG. 3 is a plan view of an example of the optical phase modulation structure 25 formed on the interface 21. The structure shown in FIG. 3 is an example of a multistep structure used in the hologram 100 shown in FIGS. 1 and 2.

The optical phase modulation structure 25 can be formed by thermal pressing with a stamper. The stamper can be obtained by electrocasting a plate with projections and recesses formed by laser lithography, electronic beam lithography, ion-beam lithography, or the like. The use of these methods makes it possible to reproducibly form the computed optical phase modulation structure 25. As another method, two-photon lithography using a femtosecond laser may be applied. In the case of using two-photon lithography, the optical phase modulation structure 25 may be formed directly on the formation layer 10.

When the formation layer 10 is formed from an organic material, the optical phase modulation structure 25 can be formed by any of various methods such that an original plate formed by any of the lithographic methods described above is turned into a metal plate by electrocasting or the like, and the formation layer 10 is pressed and embossed by the structure on the metal plate. When the organic material for the formation layer 10 is a thermoplastic or thermosetting resin, the formation layer 10 is embossed under thermal pressure. When the organic material for the formation layer 10 is a photosetting resin, the formation layer 10 is embossed while being photo-cured under pressure by the use of a light source that emits light conducive to photocuring such as ultraviolet (UV) light.

When the formation layer 10 is formed from an inorganic material, the formation layer 10 is directly subjected to lithographic treatment by using any of the lithographic methods described above, and then is subjected to chemical etching treatment or physical etching treatment to form the optical phase modulation structure 25 on the formation layer 10. Each of these treatments is a wet process or dry process so that etching is performed in a manner suited for the processing method. If the inorganic material can be subjected to a wet process such as a sol-gel process, the formation layer 10 can be formed by embossing with a metal plate. The thickness of the formation layer 10 can be 1 μm or more to 25 μm or less.

The reflection layer 11 can be formed from a material different from the formation layer 10 in refractive index. The difference in refractive index between the formation layer 10 and the reflection layer 11 generates reflection on the interface therebetween, thereby improving reflectance.

The reflection layer 11 can be formed from a metallic material and inorganic compound. The reflection layer may be a monolayer or a multilayer. The reflection layer 11 may be formed by accumulation. The accumulation may be physical accumulation, chemical accumulation, or both. The physical accumulation may be vacuum evaporation or sputtering. The metallic material may be aluminum, gold, silver, copper, nickel, or the like. The inorganic compound may be oxide, metallic nitride, or metallic sulfide. The oxide may be silicon dioxide ($SiO_2$), titania ($TiO_2$), zirconia ($ZrO_2$), or the like.

The metallic nitride may be titanium nitride (TiN), CaN, or the like. The metallic sulfide may be ZnS or the like. Using these materials for the reflection layer 11 improves the reflectance on the interface 21 with the formation layer 10 as described later. The improvement of the reflectance makes it easier to verify the first information 41 and the second information 43 reconstructed by the hologram 100 described later. The thickness of the reflection layer 11 can be 10 nm or more to 500 nm or less.

The additive layer 12 can be provided to attach the hologram 100 to another medium of base material. The material for the adhesive layer can be a thermoplastic resin. An instance of the thermoplastic resin can be an acrylic resin. The thickness of the adhesive layer can be 1 μm or more to 25 μm or less. The hologram 100 having the additive layer 12 can be a label. The label can be attached to printed matter. The printed matter with the label can be a banknote, card, booklet page, tag, poster, sign, advertisement, or board.

The hologram 100 shown in FIGS. 1 and 2 may further be provided with a protective layer on the interface 20 side. This protects the hologram 100 from physical impact or scratches.

<Reconstructed Information>

Instances of reconstructed information include graphics, photograph, character, symbol, sign, mark, logo, image, landmark, or code. The code can be a digital code. The code may be machine-readable.

Figure 4:
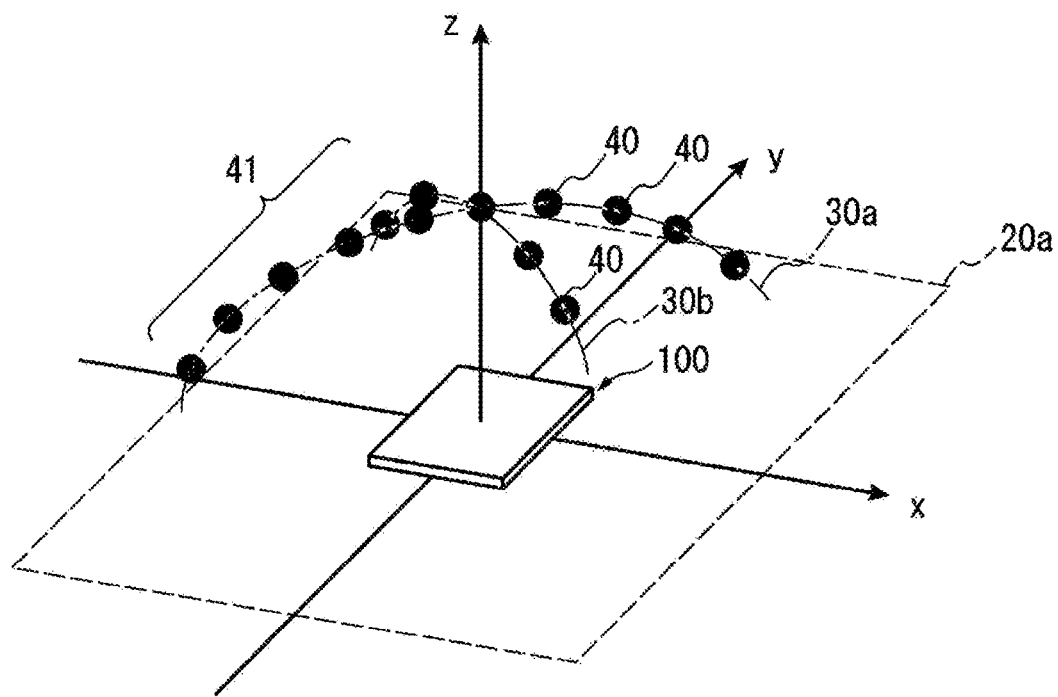
FIG. 4 is a bird's-eye view of reconstructed information from the hologram in the present disclosure.
Figure 5:
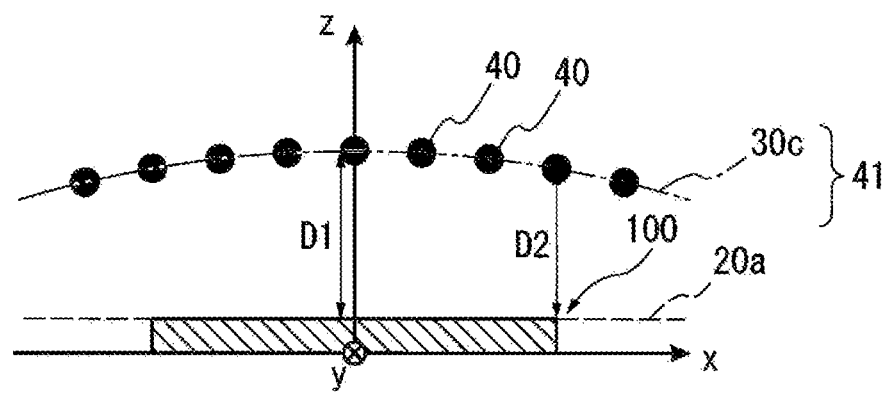
FIG. 5 is a partial cross-sectional view of an example of reconstructed information from the hologram in the present disclosure.
Figure 6:
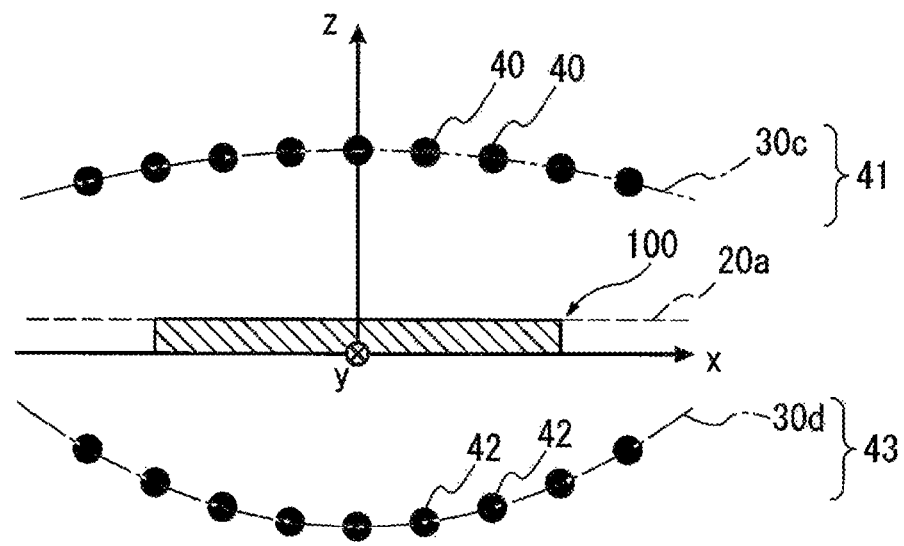
FIG. 6 is a partial cross-sectional view of reconstructed information from the hologram in the present disclosure.

FIGS. 4 and 5 are respectively a birds'-eye view and an XZ cross-sectional view of the first information 41 that is reconstructed from the hologram 100 shown in FIGS. 1 and 2. FIG. 6 is an XZ cross-sectional view of the first information 41 and second information 43 that are reconstructed from the hologram 100. The first information 41 described in FIGS. 4 and 5 is an image that is reconstructed by the optical phase modulation structure 25 on the interface 21 shown in FIGS. 1 and 2 when reference light emitted from a predetermined point light source enters the hologram 100 through the interface 20 described in FIGS. 1 and 2.

The second information 43 described in FIG. 6 is another image that is reconstructed by the optical phase modulation structure 25 on the interface 21 shown in FIGS. 1 and 2 when reference light emitted from a predetermined point light source enters the hologram 100 through the interface 20 described in FIGS. 1 and 2. The reconstructed image can be reconstructed using the light obtained through modulation of the reference light incident on the hologram 100 by the optical phase modulation structure 25. The first information 41 can be formed from a plurality of reconstruction points 40. The second information 43 can be reconstructed from a plurality of reconstruction points 42. In other words, the first information 41 can be recorded as the plurality of reconstruction points 40. The second information 43 can be recorded as the plurality of reconstruction points 42. The hologram information can be digital data.

The digital data can be recorded on a group of reconstruction points, where the individual reconstruction points are bits and the positions of the reconstruction points are bit addresses.

The bits can be recorded, indicating the presence or absence of the reconstruction points, and the brightness, shapes, colors, and others of the reconstruction points. One or two or more bits may be recorded on each of the reconstruction points. One bit on each of the reconstruction points is a single bit, and two or more bits on each of the reconstruction points are multi-bits.

FIG. 4 describes the first information 41 including the reconstruction points 40 from the hologram 100. The reconstruction points 40 can be arranged along a curved line 30a and a curved 30b to reconstruct the first information 41.

FIGS. 4 and 5 show that the first information 41 is reconstructed along the curved line 30a and the curved line 30b. However, the reconstruction points 40 may be arranged along not curved lines but straight lines to reconstruct the first information 41. In addition, some of the reconstruction points 40 may be arranged along axial directions. Specifically, some of the reconstruction points 40 may be arranged along a Z axis direction. In this case, the reconstruction of the second information 43 is unlikely to be subject to spatial constrains as described later.

Referring to FIG. 4, the first information 41 is reconstructed at a higher position than the interface 20a that is flush with the interface 20 of the hologram 100 along the Z axis direction. However, part of the first information 41 may be reconstructed at a lower position than the interface 20a. This means that all or part of the first information 41 may be reconstructed at a higher position than the interface 20a.

In this case, if the reference light emitted from a predetermined point light source not shown enters through the interface 20 different from the interface 21 of the formation layer 10, the entirety or part of an image to be reconstructed by the optical phase modulation structure 25 on the interface 21 is reconstructed as the first information 41 on the point light source side relative to the interface 20 (or the interface 20a).

FIG. 5 is an XZ cross-sectional view of the first information 41 that is reconstructed from the hologram 100. FIG. 5 describes the reconstruction points 40 that constitute part of the first information 41 along the curved line 30c. The reconstruction points 40 can be arranged at positions at different distances D1 and D2 from the interface 20a.

Referring to FIG. 5, the reconstruction points 40 are arranged at the positions at the different distances D1 and D2. However, the reconstruction points 40 may be arranged at the same distance. Referring to FIG. 5, the first information 41 is part of an image that is to be reconstructed from the reconstruction points 40 by the optical phase modulation structure 25. The reconstruction points 40 each are point information representing dot-like images. The first information 41 (part of an image to be reconstructed by the optical phase modulation structure 25) can be reconstructed from the plurality of pieces of point information. The reconstruction points 40 as point information can be positioned at the predetermined distances D1, D2, and the like from the interface 20 (or the interface 20a).

FIG. 6 is an XZ cross-sectional view of the reconstruction points 42 that are arranged along the curved line 30d as the second information 43 behind the interface 20a of the hologram 100, that is, as a virtual image.

This enhances the flexibility of reconstructed information from the hologram 100 so that more complicated reconstructed information can be obtained.

Referring to FIG. 6, the second information 43 is reconstructed behind the interface 20a. However, part of the second information 43 may be reconstructed in front of the interface 20a.

The first information 41 and the second information 43 as the reconstructed information of the hologram 100 can be a combination of the reconstruction points 40 and 42 that are positioned along any of the X, Y, and Z directions. Thus, the reconstructed information can be a three-dimensional image that floats in space. The reconstructed information can be readable or recognizable. The readable reconstructed information can be single characters, numerals, symbols, or a combination of these. The recognizable reconstructed information can be a geometric pattern. The readable reconstructed information and the recognizable reconstructed information may be combined.

The readable reconstructed information can be read visually. The recognizable reconstructed information can add aesthetic features to the hologram 100.

As shown in FIG. 6, the reconstruction points 40 and 42 can be freely arranged in the Z axis direction. Thus, if character information is reconstructed from the reconstruction points 40 and 42 at different heights on the Z axis, the character information can vary in moving direction or moving amount, or both of them, depending on the observation direction of the hologram 100.

In this case, when the reference light emitted from a predetermined point light source not shown enters through the interface 20 different from the interface 21 of the formation layer 10, the entirety or part of an image to be reconstructed by the optical phase modulation structure 25 on the interface 21 is reconstructed as the first information 41 on the point light source side relative to the interface 20 (or the interface 20a) as described above, and the entirety or part of an image to be reconstructed by the optical phase modulation structure 25 on the interface 21 is reconstructed as the second information 43 on a side opposite to that facing the point light source of the interface 20 (or the interface 20a).

As shown in FIG. 6, the second information 43 is part of an image that is reconstructed from the reconstruction points 42 by the optical phase modulation structure 25. The reconstruction points 42 each are point information representing dot-like images. The second information 43 (part of an image to be reconstructed by the optical phase modulation structure 25) can be reconstructed from the plurality of pieces of point information. The reconstruction points 42 as point information can be positioned at the predetermined distances from the interface 20 (or the interface 20a).

<Detection Device>

Figure 7:
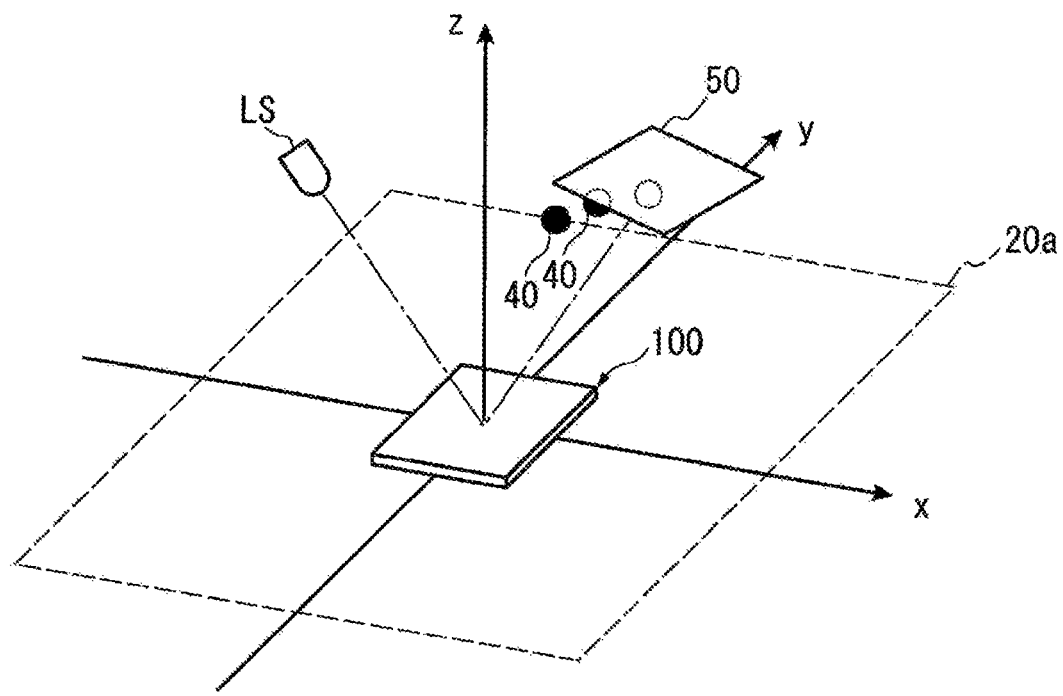
FIG. 7 is a bird's-eye view of a detection device in the present disclosure.

FIG. 7 describes that the reconstruction points 40 are acquired by an image sensor 50 when light from a point light source LS is applied to the hologram 100 shown in FIGS. 1 and 2. The point light source LS and the image sensor 50 may be separately installed or are desirably incorporated in the detection device. The point light source LS shown in FIG. 7 corresponds to the point light source 4 shown in FIGS. 18A and 18B. The image sensor 50 shown in FIG. 7 corresponds to the image sensor 5 shown in FIG. 18A.

The point light source LS and the image sensor 50 are installed in such a manner as to form a specific angle. The angle is designed at the computation of the optical phase modulation structure 25 for reconstructing the hologram 100. Referring to FIG. 7, the reconstruction points 40 arranged in a specular direction of the point light source LS are acquired by the image sensor 50. However, the point light source LS, the reconstruction points 40, and the image sensor 50 may be in an angular relationship under a condition other than specular reflection. The angular relationship is designed during computation of the optical phase modulation structure 25.

The point light source LS can be a miniature bulb or a light-emitting diode (LED) light source. The LED light source has a narrow wavelength width and a small size, thereby to sharpen a reconstructed image. The LED light source as the point light source LS can reconstruct the reconstruction information (the first information 41, the second information 43, and the like) contained in the hologram 100 detectable by the image sensor. The LED light source can be the point light source LS in colors of red, blue, green, and the like so that the reconstruction information (the first information 41, the second information 43, and the like) of the hologram 100 can be colored.

The image sensor 50 is a one-dimensional image sensor or a two-dimensional image sensor that is capable of measuring light intensity. The two-dimensional image sensor can capture an image of a certain aspect of the reconstructed information from the hologram 100. The two-dimensional image sensor can be a charge-coupled device (CCD) two-dimensional image sensor, a complementary metal oxide semiconductor (CMOS) two-dimensional image sensor, or a thin film transistor photosensor. As such an image sensor, the image sensor 50 can receive and detect the reconstruction points 40. The image sensor has a plurality of pixels that detect light intensity. The thin film transistor photosensor can be a double-gate thin film transistor photosensor.

The image sensor 50 may not be a one-dimensional image sensor or a two-dimensional image sensor but may be a phototransistor or a photodiode. A plurality of phototransistors or photodiodes may be aligned.

The image sensor 50 can be a sensor formed on a substrate. The sensor on the substrate can be a photosensor. The photosensor can be formed from a thin film transistor. The thin film transistor can be a circuit of amorphous silicon or polysilicon. The thin film transistor can be formed with the photosensor as pixels. The pixels in the photosensor can be disposed in an array. When the substrate of the image sensor 50 is a transparent substrate, one surface of the substrate can be a light-receiving surface that receives an image of a hologram and the other surface can be an entrance surface through which the reference light enters. Using a transparent substrate as the substrate of the image sensor 50 makes it possible to obtain a transmissive image sensor. Each pixel in the photosensor is desirably a transmissive image sensor 60 that is formed from a double-gate thin film transistor photosensor. The double-gate thin film transistor photosensor can adjust a dynamic range or light sensitivity, or both of them. Thus, the double-gate thin film transistor photosensor can adjust the dynamic range or sensitivity, or both of a hologram image with large brightness differences according to the brightness of the hologram, thereby accomplishing image capture at a high S/N ratio.

The image sensor 50 can be the transmissive image sensor 60 that is formed on the transparent substrate as shown in FIGS. 9A to 9C and 10 and includes a thin film transistor photosensor with one surface of the substrate as a light-receiving surface and the other surface through which the reference light enters. The transmissive image sensor 60 corresponds to the image sensor 5 shown in FIG. 18A or the image sensor 5a shown in FIG. 18B. This provides light transparency to the two-dimensional image sensor. Thus, the interface of the two-dimensional image sensor (for example, a light-receiving interface 61 shown in FIG. 10) constitutes a two-dimensional scan surface to perform scanning with intermittent position changes in the height direction. Accordingly, when the reconstruction points 40 for reconstructing the first information 41 concentrate on the two-dimensional scan surface, the concentrating reconstruction points 40 and the other reconstruction points 40 can be separately acquired.

Figure 8A:
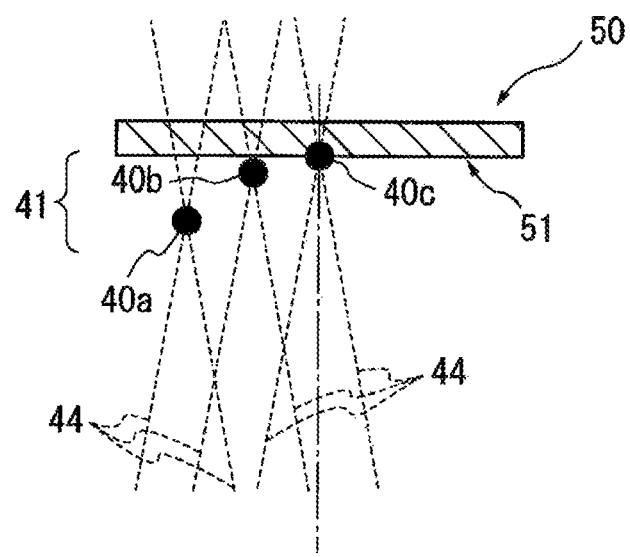
FIG. 8A is a partial cross-sectional view of an image sensor used in the detection device according to an embodiment of the present embodiment.
Figure 8B:
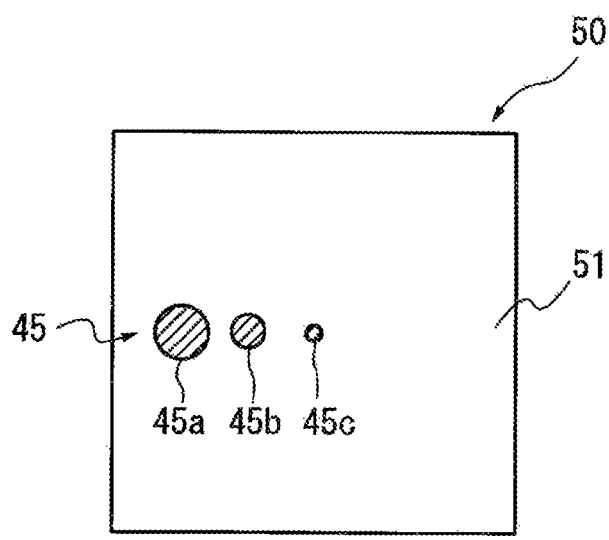
FIG. 8B is a plan view of the image sensor used in the detection device according to the embodiment of the present embodiment.

FIGS. 8A and 8B are respectively a partially enlarged cross-sectional view (FIG. 8A) of the image sensor 50 and the reconstruction points 40 shown in FIG. 7 and a plan view of a light-receiving interface 51 of the image sensor 50 (FIG. 8B).

FIG. 8A describes that reconstructed points 40a, 40b, and 40c are applied to the light-receiving interface 51 of the image sensor 50. FIG. 8A also shows an example in which the reconstruction point 40c is focused on the light-receiving interface 51. The reconstruction points 40a and 40b can both focused on a portion in front of the light-receiving interface 51.

The reconstruction point 40c can be focused on the light-receiving interface 51. The reconstruction points 40a, 40b, and 40c can be focused on corresponding reconstruction points via light paths 44.

FIG. 8B describes the intensity distribution of the reconstruction points 40a, 40b, and 40c shown in FIG. 8A on the light-receiving interface 51. The regions where the light of the reconstruction points is detected on the light-receiving interface 51 are light-receiving regions. The light-receiving regions corresponding to the reconstruction points 40a, 40b, and 40c are respectively regions 45a, 45b, and 45c. Since the reconstruction point 40c s focused on the light-receiving interface 51 as shown in FIG. 8A, the region 45c is the smallest in size and high in intensity. On the other hand, the reconstruction point 40a is focused on the corresponding region 45a at a position separated from the light-receiving interface 51, and thus the region 45a is large in size and low in intensity. Thus, the distances between the reconstruction points and the light-receiving interface 51 can be measured. The positions of the reconstruction points on the light-receiving interface 51 can be measured from the centers of the corresponding light-receiving regions.

In this manner, the positions of the reconstruction points 40 can be detected by the center positions of the light-receiving regions, the sizes of the light-receiving regions 45 (the regions 45a, 45b, and 45c) on the light-receiving interface 51, and the intensities of the regions 45. This makes it possible to detect the spatial positions of the reconstruction points 40 constituting the first information 41 obtained from the hologram 100 by a combination of the point light source LS and the image sensor 50.

Figure 9A:
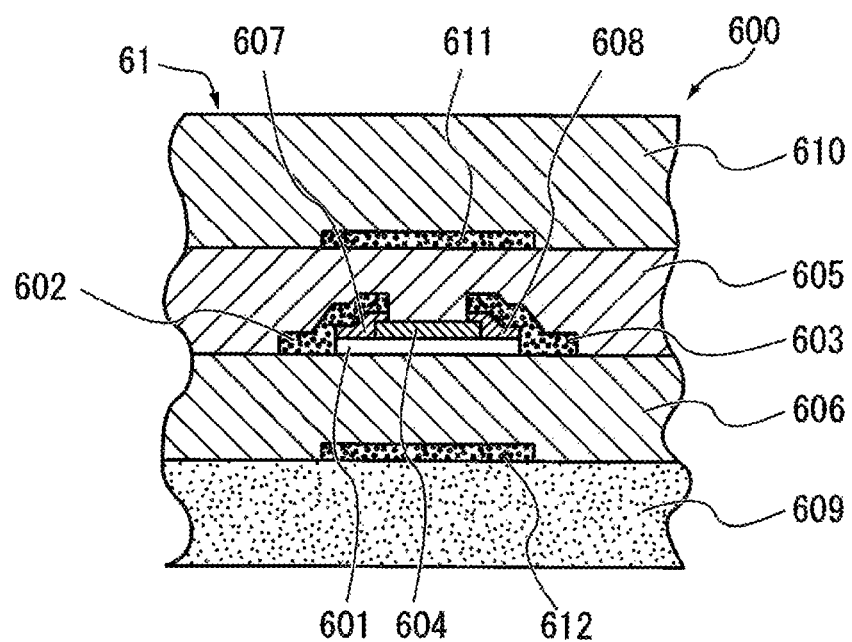
FIG. 9A is a schematic cross-sectional view of an example of a double-gate thin film transistor constituting a transmissive image sensor 60 used in the detection device according to the embodiment of the present invention.
Figure 9B:
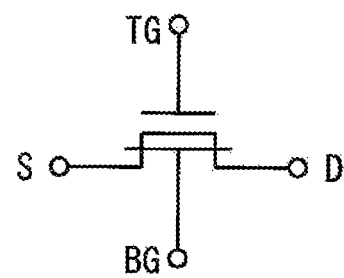
FIG. 9B is a diagram showing an equivalent circuit of the double-gate thin film transistor shown in FIG. 9A.
Figure 9C:
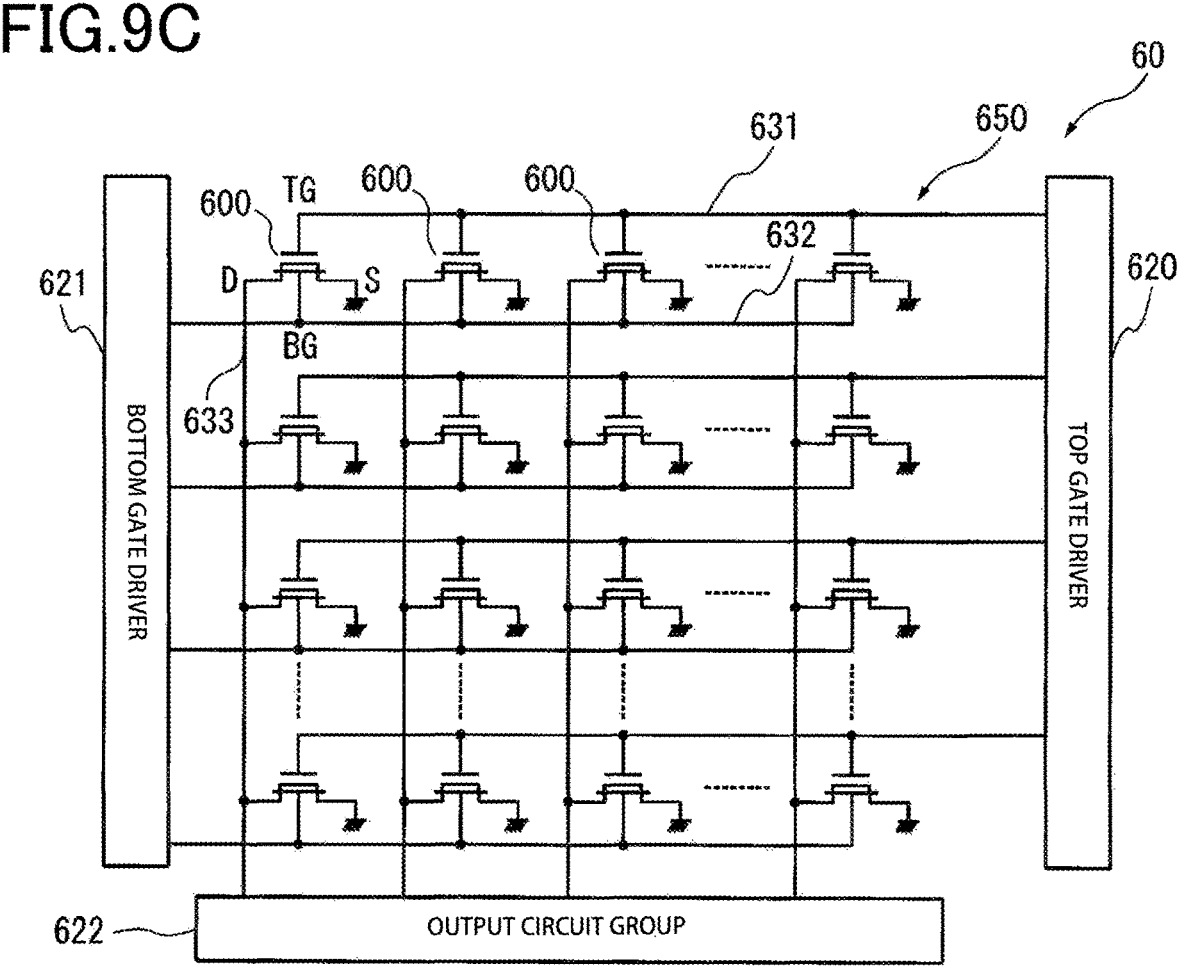
FIG. 9C is a schematic circuit diagram of the transmissive image sensor 60 used in the detection device according to the embodiment of the present invention.

FIGS. 9A to 9c are respectively a schematic cross-sectional view of a double-gate thin film transistor in a double-gate thin film transistor sensor, an equivalent circuit diagram, and a schematic circuit diagram of the transmissive image sensor 60. The double-gate thin film transistor sensor can be the transmissive image sensor 60.

FIG. 9A is a schematic cross-sectional view of a structure of the double-gate thin film transistor. As shown in FIG. 9A, the double-gate thin film transistor 600 includes a semiconductor layer 601, a source electrode 602, a drain electrode 603, a transparent insulating film 604, a top gate insulating film 605, a bottom gate insulating film 606, ohmic contact layers 607 and 608, an insulating substrate 609, a protective insulating film 610, a top gate electrode 611, and a bottom gate electrode 612.

The semiconductor layer 601 includes amorphous silicon in which electron-hole pairs are generated when visible light is incident thereon. The source electrode 602 and the drain electrode 603 are respectively formed on the ohmic contact layers 607 and 608. The ohmic contact layers 607 and 608 are provided on ends of the semiconductor layer 601. The top gate electrode 611 is formed above the semiconductor layer 601 with the transparent insulating film 604 therebetween. The bottom gate electrode 612 is formed under the semiconductor layer 601 with the bottom gate insulating film 606 therebetween. The protective insulating film 610 is provided on the top gate electrode 611.

Referring to FIG. 9A, the top gate electrode 611, the top gate insulating film 605, the bottom gate insulating film 606, and the protective insulating film 610 are all formed from materials with high transmittance of visible light exciting the semiconductor layer 601. On the other hand, the bottom gate electrode 612 is formed from a material blocking transmission of the visible light. Accordingly, the double-gate thin film transistor 600 is structured to detect only the irradiation light entering from the upper side shown in the diagram. Specifically, the double-gate thin film transistor 600 has on the insulating substrate 609 a structure in which two metal oxide semiconductor (MOS) transistors are combined with the semiconductor layer 601 as a common channel region. The two MOS transistors include: an upper MOS transistor formed from the semiconductor layer 601, the source electrode 602, the drain electrode 603, and the top gate electrode 611; and a lower MOS transistor formed from the semiconductor layer 601, the source electrode 602, the drain electrode 603, and the bottom gate electrode 612. The insulating substrate 609 is a transparent substrate such as a glass substrate or a film substrate. This double-gate thin film transistor 600 is generally represented by an equivalent circuit as shown in FIG. 9B. In the circuit diagram, TG denotes the top gate terminal, BG the bottom gate terminal, S the source terminal, and D the drain terminal.

The bottom gate electrode 612 may be formed from a material blocking transmission of visible light. The image sensor can be a transmissive image sensor if the pattern width is hard to visually recognize, specifically 300 μm or less, or if the aperture ratio with a two-dimensional array of the double-gate thin film transistors 600 is 50% or more.

Next, the transmissive image sensor 60 formed by two-dimensionally arraying the double-gate thin film transistors 600 will be briefly described with reference to the drawings. FIG. 9C is a schematic configuration diagram of the transmissive image sensor 60 formed by two-dimensionally arraying the double-gate thin film transistors 600. As shown in FIG. 9C, the transmissive image sensor 60 is also called a photosensor set and roughly includes a photosensor array 650, top gate lines 631, bottom gate lines 632, a top gate driver 620, a bottom gate driver 621, data lines 633, and an output circuit unit 622.

The photosensor array 650 may be formed by aligning a large number of double-gate thin film transistors 600 in a matrix with n rows and m columns. In this case, one double-gate thin film transistor 600 constitutes one pixel. The plurality of top gate lines 631 connects top gate terminals TG of the plurality of double-gate thin film transistors 600 in the corresponding columns in the column direction. The plurality of bottom gate lines 632 connects bottom gate terminals BG of the plurality of double-gate thin film transistors 600 in the corresponding columns in the column direction. The top gate lines 631 are connected to the top gate driver 620. The bottom gate lines 632 are connected to the bottom gate driver 621. The plurality of data lines 633 connects drain terminals D of the plurality of double-gate thin film transistors 600 in the corresponding rows in the row direction. The data lines 633 are connected to the output circuit unit 622.

In this configuration, the transmissive image sensor 60 implements the function of a photosensor by applying a voltage from the top gate driver 620 to the top gate terminals TG, and implements the reading function by applying a voltage from the bottom gate driver 621 to the bottom gate terminals BG and receiving detection signals into the output circuit unit 622 via the data lines 633 and outputting the signals as serial data. That is, one double-gate thin film transistor 600 serves as a double-gate thin film transistor photosensor that constitutes one pixel in the image sensor.

The double-gate thin film transistors each can implement a highly sensitive photosensor with a high S/N ratio in a simple pixel circuit on the light-transmissive substrate such as a glass substrate, thereby realizing a high-performance and high-transmittance image sensor 60. The double-gate thin film transistors can be formed from amorphous silicon.

The transmissive image sensor 60 shown in FIG. 9C is incorporated into detection devices 70 and 71 described later with reference to FIGS. 14A and 14B such that the point light source is positioned on the insulating substrate 609 side and the hologram 100 is positioned on the protective insulating film 610 (the light-receiving interface 61) side in FIG. 9A. The detection device 70 shown in FIG. 14A corresponds to the detection device 2 shown in FIG. 18A, and the detection device 71 shown in FIG. 14B corresponds to the detection device 2a shown in FIG. 18B.

Setting the insulating substrate 609 as a transmissive substrate formed from a thin glass plate, a light-transmissive resin film, or the like makes it possible to reduce the thickness of the entire transmissive image sensor 60 and laminate a plurality of transmissive image sensors 60 as described later. This achieves the simplified internal configuration and miniaturization of the detection device 71 and others.

Figure 10:
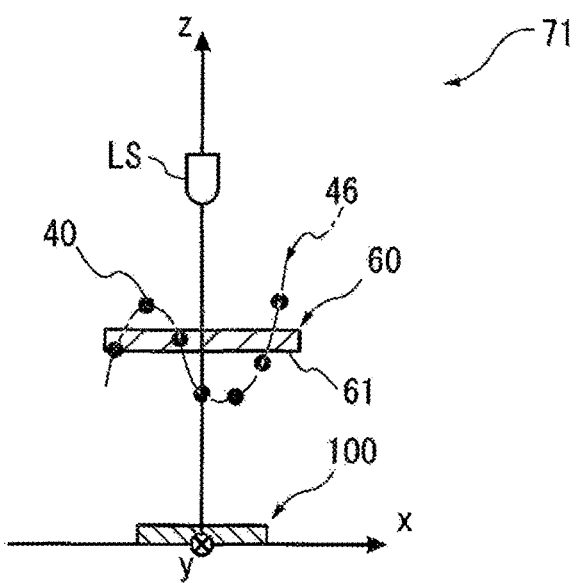
FIG. 10 is a schematic cross-sectional view of the detection device according to the embodiment of the present invention.
Figure 11:
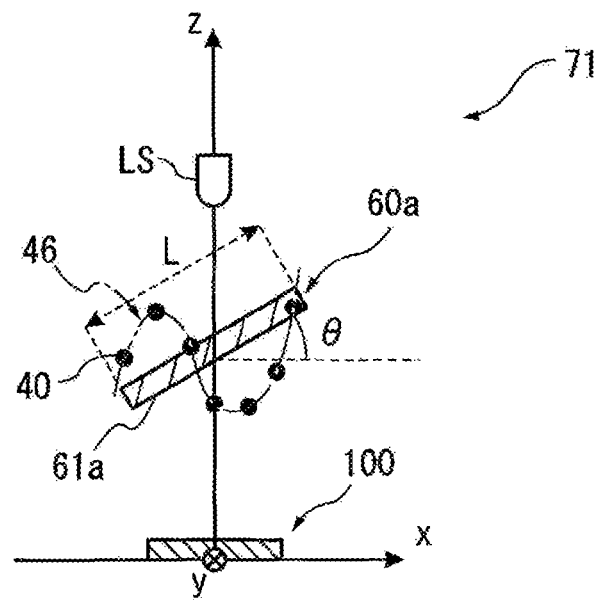
FIG. 11 is another schematic cross-sectional view of the detection device according to the embodiment of the present invention.
Figure 12:
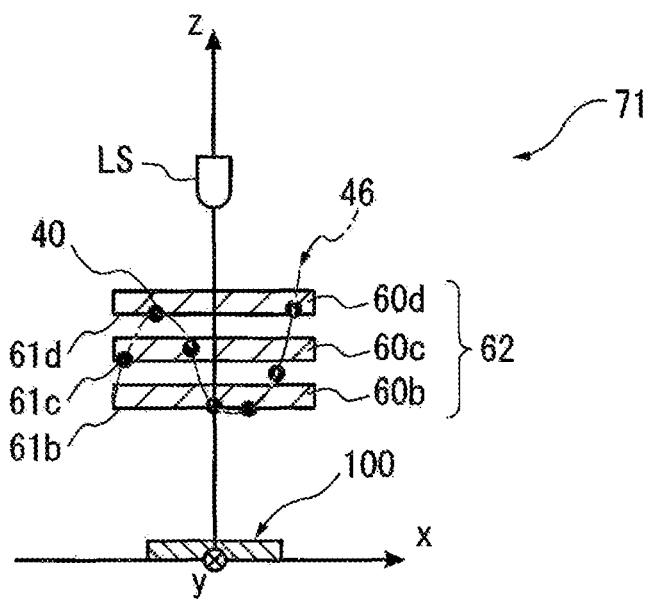
FIG. 12 is another schematic cross-sectional view of the detection device according to the embodiment of the present invention.

FIGS. 10 to 12 schematically show a positional relationship between the detection device 71 and the hologram 100 on the XZ cross section when the point light source LS and the transmissive image sensor 60 are used. The detection device 71 shown in FIGS. 10 to 12 includes the point light source LS and the transmissive image sensor 60.

FIG. 10 shows the hologram 100 and the transmissive image sensor 60 that are provided parallel with each other. FIG. 11 shows the hologram 100 and a transmissive image sensor 60a that are inclined to face each other at an angle θ. FIG. 12 shows transmissive image sensors 60b, 60c, and 60d that are laminated in the Z axis direction. The point light source LS shown in FIGS. 10 to 12 corresponds to the point light source 4 shown in FIG. 18B. The transmissive image sensors 60a to 60d shown in FIGS. 11 to 12 are configured in the same manner as the transmissive image sensor 60 shown in FIG. 10. The transmissive image sensors 60, 60a and a transmissive image sensor group 62 correspond to the image sensor 5a shown in FIG. 18B.

Referring to FIGS. 10 to 12, the image sensor has light transparency, whereby the point light source LS and the transmissive image sensor 60 can be placed on the same optical axis. This achieves miniaturization and simplification of the detection device 71.

Referring to FIG. 10, it is possible to obtain by the transmissive image sensor 60 an XY plan view based on first information 46 reconstructed from the hologram 100 on the light-receiving interface 61 on the side where the transparent gate electrode (the top gate electrode 611) is provided. The first information 46 corresponds to the first information 41 shown in FIG. 5 and others.

The Z position of the light-receiving interface 61 can be altered by changing the distance between the hologram 100 and the transmissive image sensor 60, which makes it possible to acquire a plurality of XY plan views at different Z positions based on the first information 46.

Spatial information in the first information 46 can be acquired by sequentially changing the distance between the hologram 100 and the transmissive image sensor 60 by the use of the detection device 71 shown in FIG. 10. This distance can be shifted by a device that controls the position of the transmissive image sensor 60 in the detection device 71. The spatial information can be a set of values associated with coordinates in a three-dimensional space. The spatial information can be implemented as a hologram that reconstructs reconstruction points in the space. The spatial information reconstructed by a hologram is not planar information but three-dimensional information that varies depending on illumination conditions and other factors. Thus, the spatial information cannot be copied from a two-dimensional captured image of the hologram. The spatial information reconstructed by a hologram cannot be copied by a photocopier unlike a printable QR code (registered trademark). Therefore, it is possible to prevent illicit copying and abuse of the spatial information reconstructed by a hologram.

Referring to FIG. 11, the transmissive image sensor 60a is inclined at the angle θ relative to the hologram 100, which makes it possible to acquire the first information 46 corresponding to the light-receiving interface 61a.

Configuring the detection device 71 as shown in FIG. 11 makes it possible to acquire the spatial information of the first information 46 only by changing the X, Y positions of the hologram 100. This eliminates the need to provide an adjuster for the transmissive image sensor 60 in the detection device 71 and allows the detection device 71 to be installed at a fixed position.

Referring to FIG. 11, the inclination angle θ of the transmissive image sensor 60a is greater than 0 degree and equal to or smaller than 90 degrees, and, more specifically, can be 30 to 90 degrees inclusive. When the inclination angle θ is 30 degrees or more, its sign is 0.5 or more so that information on height equivalent to half a length L of the transmissive image sensor 60a can be acquired. When the inclination angle θ is 90 degrees, information on height corresponding to the length L of the transmissive image sensor 60a can be acquired. The spatial information of the first information 46 can be acquired using the detection device 71 shown in FIG. 11 by sequentially changing the XY positions of the detection device 71 or by sequentially changing the XY positions of the hologram 100.

Referring to FIG. 12, the detection device 71 has the transmissive image sensor group 62 in which transmissive image sensors 60b, 60c, and 60d are laminated therein. This makes it possible to acquire collectively the spatial information of the first information 46. Referring to FIG. 12, the three transmissive image sensors are laminated. However, the transmissive image sensor group 62 may include at least two or more transmissive image sensors.

Figure 13:
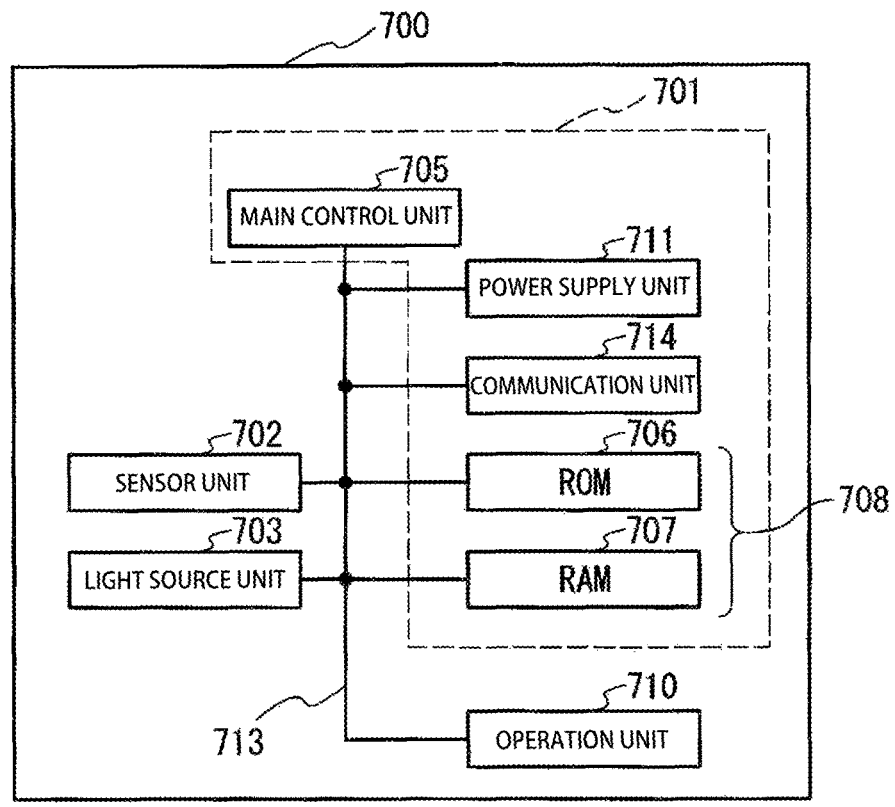
FIG. 13 is a block line diagram describing an example of the detection device according to the embodiment of the present invention.

FIG. 13 is a hardware block diagram, which shows a detection device 700 as a configuration example of the detection devices 70 and 71 in the present embodiment. The detection device 700 corresponds to the detection devices 2 and 2a shown in FIGS. 18A and 18B.

As shown in FIG. 13, the detection device 700 can include a sensor unit 702, a light source unit 703, a control unit 701, and an operation unit 710. The sensor unit 702, the light source unit 703, the control unit 701, and the operation unit 710 can be connected together via a bus 713. The bus 713 can electrically connect various functional units to transfer data or the like.

The sensor unit 702 optically reads the first information 41, 46, and 81 (FIG. 15) and the third information 85 (FIG. 15) reconstructed by the hologram 100 or the like, and converts the read information into electrical signals. The sensor unit 702 corresponds to the image sensors 5 and 5a shown in FIGS. 18A and 18B.

The light source unit 703 is used to read optical information by the sensor unit 702. The light source unit 703 corresponds to the point light source 4 shown in FIGS. 18A and 18B.

The control unit 701 controls the detection device 700. The control unit 701 can include a main control unit 705 containing a central processing unit (CPU) and others, a power source unit 711, a communication unit 714, and a storage 708.

The storage 708 may be provided with a read only memory (ROM) 706 or a random access memory (RAM) 707, or both of them. The ROM 706 is a nonvolatile memory that can store basic information such as programs. The RAM 707 is a volatile memory as a work memory where the main control unit 705 reads and executes programs and data. The RAM 707 can store various kinds of information such as data acquired by the sensor unit 702 and data having undergone predetermined conversion processing. The RAM 707 also store data having been processed by external terminals as necessary. The RAM 707 may be a flash memory or an external memory medium.

The operation unit 710 may receive operation instructions. The operation unit 710 may be a touch panel. The operation unit 710 may display information and input data.

<Verification of Authenticity>

Figure 14A:
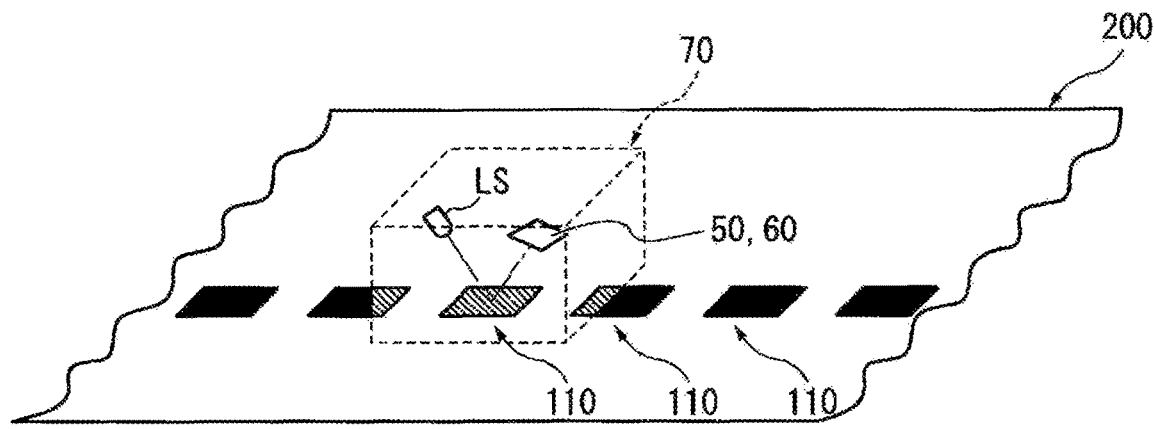
FIG. 14A is a schematic diagram describing an example of a method for verifying authenticity using a combination of a hologram and a detection device according to an embodiment of the present invention.
Figure 14B:
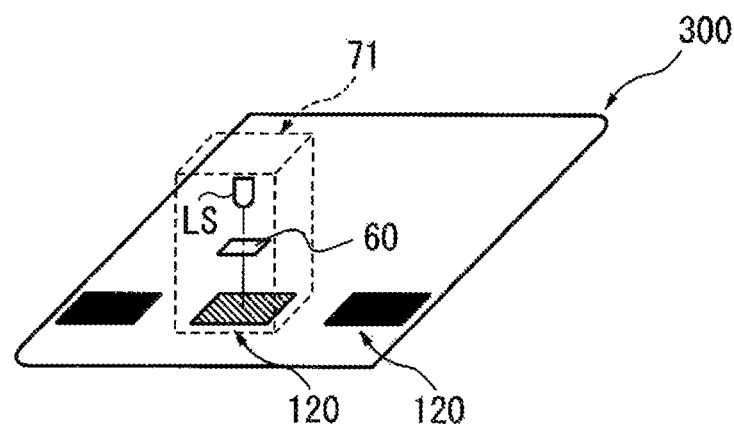
FIG. 14B is a schematic diagram describing another example of a method for verifying authenticity by a combination of a hologram and a detection device according to the embodiment of the present invention.

FIG. 14A describes verification of authenticity of reconstructed information from a hologram 110 at the time of production, and FIG. 14B describes verification of authenticity of reconstructed information from a hologram 120 attached to a medium 300. The hologram 110 and the hologram 120 are configured in the same manner as the hologram 100 and correspond to the hologram 3 shown in FIGS. 18A and 18B.

Referring to FIG. 14A, the detection device 70 is provided to, when a carrier film 200 including the holograms 110 is conveyed at the time of production, detect and examine the reconstructed information from the holograms 110. The detection device 70 has the point light source LS and the image sensor 50 incorporated therein. When the light from the point light source LS is applied to the hologram 110, the reconstructed information from the hologram 110 can be acquired by the image sensor 50 or the transmissive image sensor 60.

FIG. 14B shows that the reconstructed information from the hologram 120 attached to the display medium 300 is acquired by the detection device 71. The detection device 71 has the point light source LS and the transmissive image sensor 60 coaxially incorporated therein.

As shown in FIGS. 14A and 14B, the reconstructed information from the holograms 110 and 120 on the display media at or after the production can be acquired by the detection devices 70 and 71.

Thus, acquiring the information visually observed from the holograms 110 and 120 by the detection devices 70 and 71 and comparing the acquired reconstructed information to design information corresponding to the fourth information used at the computation of the optical phase modulation structure 25 constituting the holograms 110 and 120 makes it possible to determine whether the holograms 110 and 120 have been correctly manufactured.

Both the first information 41 reconstructed in front of the interface 20a of the holograms 110 and 120 and the second information 43 reconstructed behind the interface 20a can be inspected by visual observation of the holograms 110 and 120. On the other hand, the first information 41 or only part of the first information 41 can be acquired by the use of the detection devices 70 and 71.

This makes the information obtained by the visual inspection and the information obtained by the detection devices 70 and 71 different. Counterfeiting of the holograms 110 and 120 would require producing holograms that reconstruct both the information obtained by visual inspection and the information obtained by detection devices. Since it is hard to produce such holograms, the holograms 110 and 120 are highly counterfeit-resistant.

Figure 15:
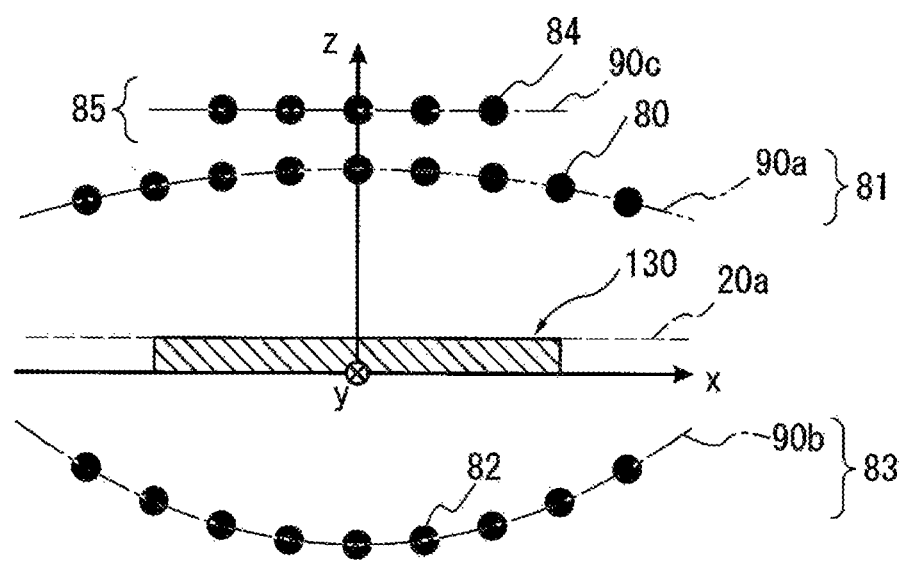
FIG. 15 is a partial cross-sectional view of an example of reconstructed information from the hologram according to the embodiment of the present invention.

FIG. 15 describes a hologram 130 that, when irradiated with reference light from above in the Z axis direction, reconstructs the first information 81 and the third information 85 in a positive direction along the Z axis from the interface 20a of the hologram and reconstructs second information 83 in a negative direction. The hologram 130 is configured in the same manner as the hologram 100, and corresponds to the hologram 3 described in FIGS. 18A and 18B. The first information 81 corresponds to the first information 41 and the first information 46, and the second information 83 corresponds to the second information 43.

Reconstruction points 80 are positioned along a curved line 90a to reconstruct the first information 81, reconstruction points 82 are positioned along a curved line 90b to reconstruct the second information 83, and reconstruction points 84 are positioned along a straight line 90c to reconstruct the third information 85. The surface shapes formed by the curved line 90a, 90b and the straight line 90c are not limited to curved surface or planar surface but may be any surface shapes that are capable of indicating the first information 81, the second information 83, and the third information 85, respectively.

The positions of the reconstruction points 80 constituting the first information 81 and the reconstruction points 84 constituting the third information 85 can be substantially the same on the XY plane of the reconstruction points 80 and 84 (they overlap in the horizontal direction), and the distance between the reconstruction points 80 and the reconstruction points 84 along the Z axis can be within 5 mm, more specifically, within 1 mm. This makes it possible to conceal and hide the third information 85 behind the first information 81 at the time of visual observation of the hologram 130.

If the first information 81 is reconstructed at random on the XY plane by the plurality of reconstruction points 80, the third information 85 may also be reconstructed at random by the plurality of reconstruction points 84 so that the reconstruction points 84 are arranged at substantially the same positions as the reconstruction points 80 constituting the first information 81 on the XY plane. This also makes it possible to conceal and hide the third information 85 behind the first information 81 at the time of visual observation of the hologram 130.

The hologram 130 shown in FIG. 15 can be verified for authenticity by the detection devices 70 and 71 in such a manner as to acquire the first information 81 and the third information 85 at the same time by the detection devices 70 and 71 and use the third information 85 having been hidden at the time of visual observation as the key element of the authenticity verification. The hologram 130 can be verified for authenticity by collating the third information 85 and the first information 81. The third information 85 can be generated based on the first information 81. The third information 85 can be generated based on the first information 81 by the use of a secret key. The third information 85 and the first information 81 can be collated by the use of a public key corresponding to the secret key. The secret key can be made unidentifiable from the public key within a realistic time frame. The third information 85 may be generated based on the first information 81 by the use of a hash function.

As described above, the authenticity of the hologram 130 can also be judged by comparing and analyzing the design information corresponding to the fourth information used at the computation of the optical phase modulation structure 25 included in the hologram 130 and the information acquired by the detection devices 70 and 71.

In this case, when reference light emitted from a predetermined point light source not shown enters through the interface 20 different from the interface 21 of the formation layer 10, all or part of an image to be reconstructed by the optical phase modulation structure 25 on the interface 21 is reconstructed as the first information 81 on the curved line 90a (curved surface (first surface) along the interface 20 in the two-dimensional cross section) positioned on the point light source side relative to the interface 20 (or the interface 20a). Further, all or part of an image to be reconstructed by the optical phase modulation structure 25 on the interface 21 is reconstructed as the third information 85 on the curved line 90a (planar surface (second surface) along the interface 20 in the two-dimensional cross section) on the point light source side relative to the interface 20 (or the interface 20a). The first surface and the second surface are different from each other. The first surface and the third surface are also different from each other but are in proximity.

As shown in FIG. 15, the first information 81 is part of an image to be reconstructed by the optical phase modulation structure 25 and can be recorded as the reconstruction points 80. The reconstruction points 80 are each point information so that the first information 81 (part of an image to be reconstructed by the optical phase modulation structure 25) can be recorded as a plurality of pieces of point information. The second information 83 is part of an image to be reconstructed by the optical phase modulation structure 25 and can be recorded as the reconstruction points 82. The reconstruction points 82 are each point information so that the second information 83 (part of an image to be reconstructed by the optical phase modulation structure 25) can be recorded as a plurality of pieces of point information. The third information 85 is part of an image to be reconstructed by the optical phase modulation structure 25 and can be recorded as the reconstruction points 82. The reconstruction points 82 are each point information so that the third information 85 (part of an image to be reconstructed by the optical phase modulation structure 25) can be recorded as a plurality of pieces of point information. The reconstruction points 80 as point information can be arranged at predetermined distances from the interface 20 (or the interface 20a). The reconstruction points 82 as point information can be arranged at the predetermined distances from the interface 20 (or the interface 20a). The reconstruction points 84 as point information can be positioned at the predetermined distances from the interface 20 (or the interface 20a).

When the reconstruction points 80 constituting the first information 81 and the reconstruction points 84 constituting the third information 85 are at substantially the same positions on the XY plane (they overlap in the horizontally direction), the horizontal positions of all or some of the plurality of pieces of point information for reconstructing the first information 81 relative to the interface 20 (or the interface 20a) and the horizontal positions of all or some of the plurality of pieces of point information for reconstructing the third information 85 relative to the interface 20 (or the interface 20a) can overlap each other.

<Hologram>

The hologram will be described based on experimental results shown in FIGS. 16A and 16B.

Figure 16A:
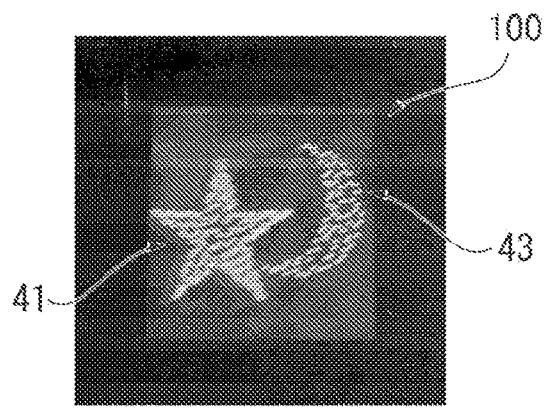
FIG. 16A is a diagram showing an example of observation of outer appearance of the hologram according to the embodiment of the present invention.

FIG. 16A is a photograph of the hologram 100 in the present embodiment that is irradiated with reference light from a point light source, which is an image of the outer appearance of the hologram 100 when visually observed. The hologram 100 can reconstruct a star pattern as an example of the first information 41 and can reconstruct a moon pattern as an example of the second information 43.

The hologram 100 as shown in FIG. 16A can be produced in the manner as described below. First, drawing data of the optical phase modulation structure 25 is computed by a computer such that the hologram 100 reconstructs the star pattern as the first information 41 and the moon pattern as the second information 43. The drawing data obtained from the computation results is used to draw the mold of the optical phase modulation structure 25 on a resist plate by electron-beam lithography and form it into a glass substrate. Then, the glass substrate is subjected to electrocasting, thereby obtaining a metal plate.

Next, a carrier film is coated with resin to form a pre-mold film, and the pre-mold film is embossed with the metal plate to produce a molded film with the optical phase modulation structure 25. Then, a reflection layer is deposited on the molded film to obtain the hologram 100.

The point light source LS and the transmissive image sensor 60 are coaxially provided on the upper surface of the produced hologram 100. The hologram 100 and the transmissive image sensor 60 are brought into close contact with each other. Then, the first information 41 reconstructed by the hologram 100 is obtained via the transmissive image sensor 60 at different distances of 0, 2, 4, 6, 8, and 10 mm between the hologram 100 and the transmissive image sensor 60. FIG. 16B shows image information acquired by the transmissive image sensor 60 at the different distances between the hologram 100 and the transmissive image sensor 60.

Figure 16B:
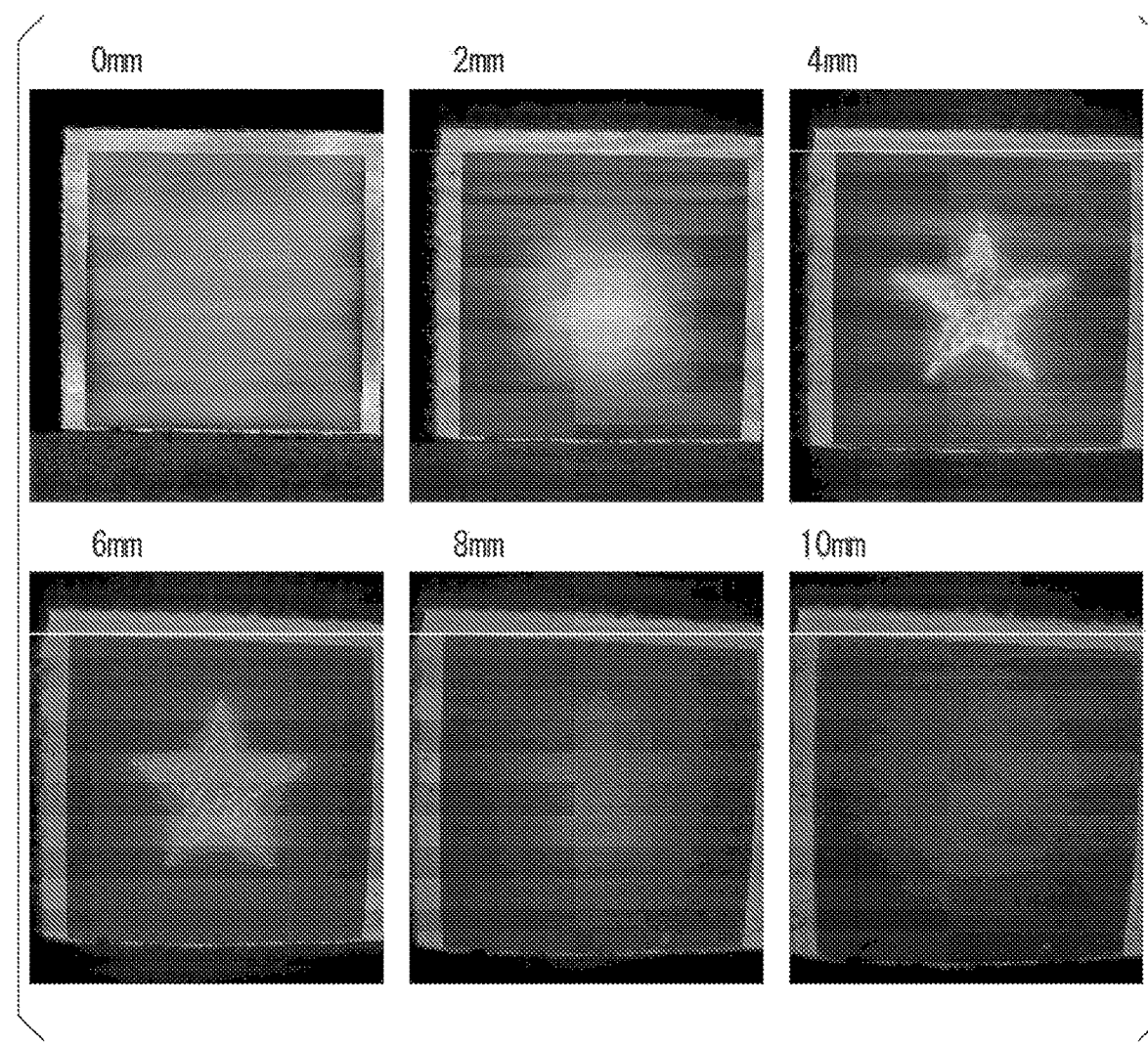
FIG. 16B is a diagram showing an example of acquisition results of reconstructed information from the hologram according to the embodiment of the present invention.

The star pattern as the first information 41 observed as shown in FIG. 16A can be acquired by the transmissive image sensor 60 as shown in FIG. 16B. On the other hand, the moon pattern as the second information 43 is not acquired.

Referring to FIG. 16B, the star pattern as the first information 41 can be acquired without blurring at the distance of 6 mm between the hologram 100 and the transmissive image sensor 60. The distance of 6 mm matches the position of the reconstructed information of the star pattern corresponding to the first information 41 that was set at the time of computation of the optical phase modulation structure 25 constituting the hologram 100, so that it can be seen that the hologram 100 is properly produced.

<Detection Set>

A detection set will be described with reference to FIGS. 17A to 17D.

Figure 17A:
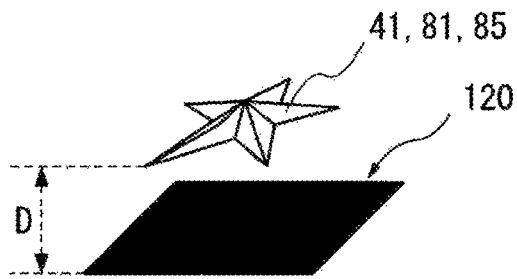
FIG. 17A is an overhead view of reconstruction of first information or third information from the hologram according to the embodiment of the present invention.

FIG. 17A describes that a star-shaped three-dimensional image corresponding to the first information 41, 81 or the third information 85 is constructed by irradiating the hologram 120 with light from a point light source at a position separated by a distance D from the topmost surface of the hologram 120.

Figure 17B:
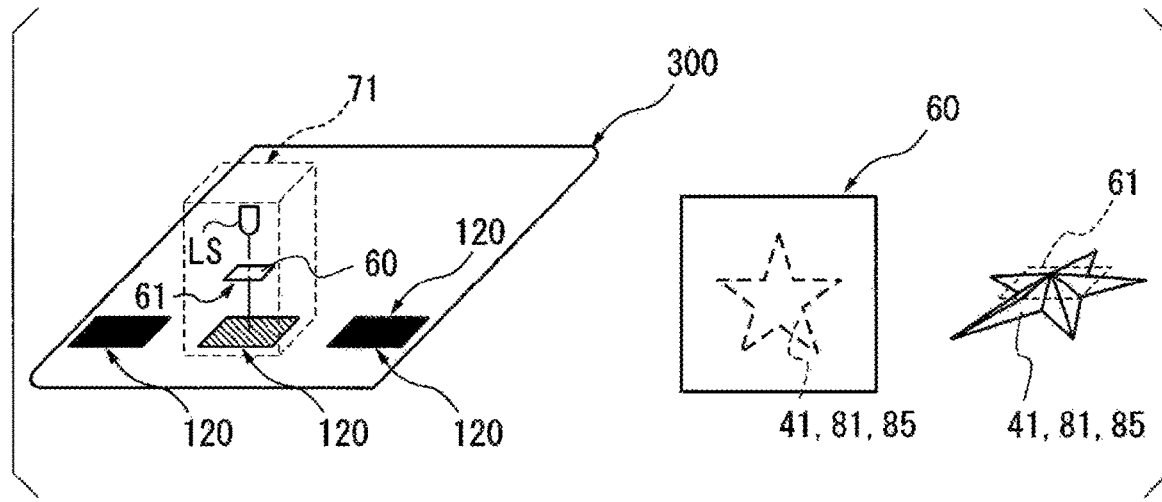
FIG. 17B is a schematic diagram describing another example of the method for verifying authenticity by the combination of the hologram and the detection device according to the embodiment of the present invention.
Figure 17C:
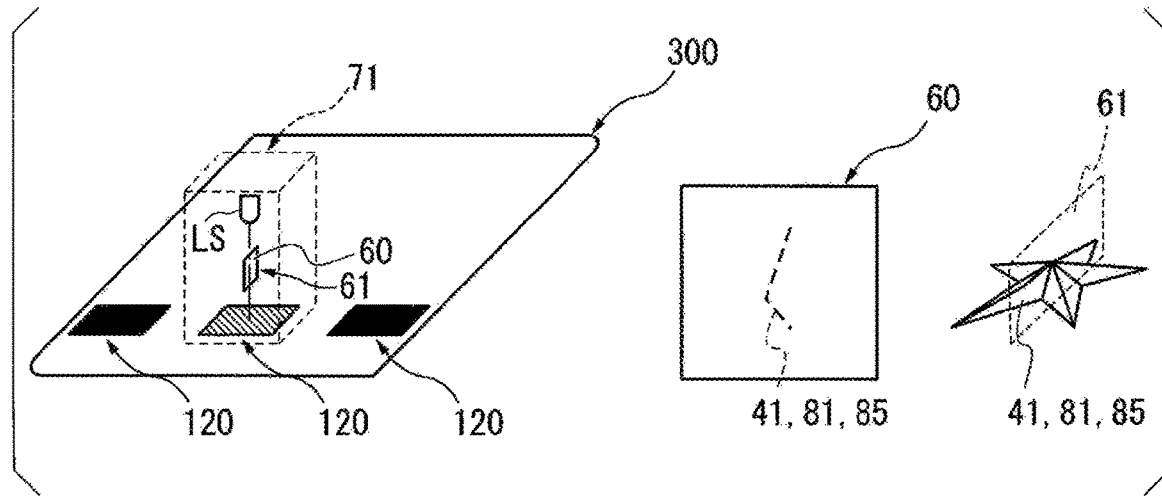
FIG. 17C is a schematic diagram describing another example of the method for verifying authenticity by the combination of the hologram and the detection device according to the embodiment of the present invention.
Figure 17D:
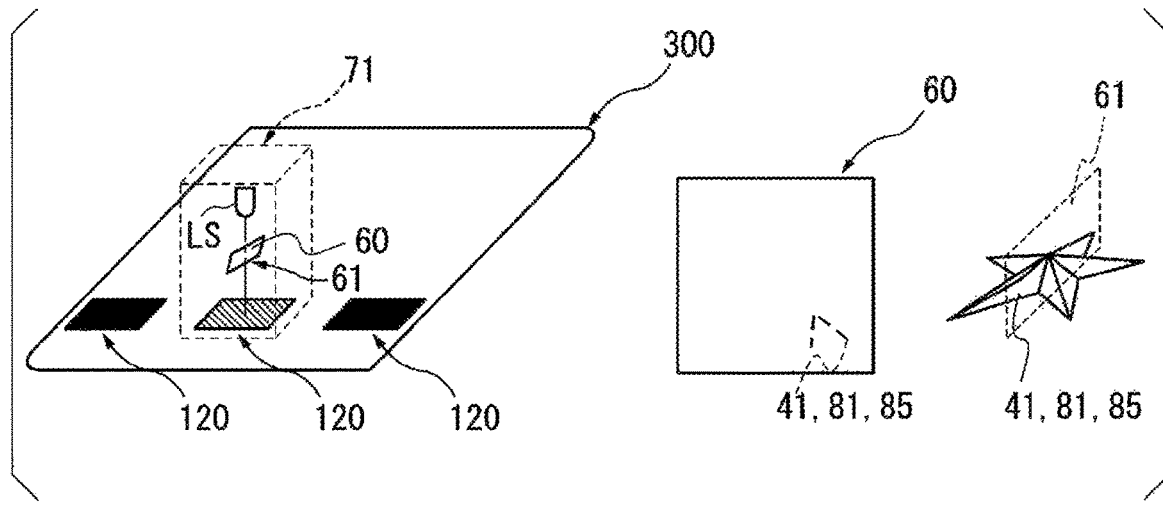
FIG. 17D is a schematic diagram describing another example of the method for verifying authenticity by the combination of the hologram and the detection device according to the embodiment of the present invention.

FIGS. 17B to 17D describe that the holograms 120 are attached to the medium 300. FIG. 17B describes that the transmissive image sensor 60 in the detection device 71 is substantially parallel to the medium 300 and the hologram 120 and that part of the star-shaped three-dimensional image is acquired by the light-receiving interface 61 of the transmissive image sensor 60.

Similarly, referring to FIG. 17C, the transmissive image sensor 60 is positioned along a direction orthogonal to the medium 300, which makes it possible to acquire information at the intersection of the light-receiving interface 61 of the transmissive image sensor 60 and the star-shaped three-dimensional image. Referring to FIG. 17D, the elevation and azimuth of the transmissive image sensor 60 take specific values, which makes it possible to acquire information at the intersection of the light-receiving interface 61 of the transmissive image sensor 60 and the star-shaped 3D image as in the case described above.

The hologram 120 can be reconstructed by using the fourth information that was used to design the first information 41, 81 or the third information 85. The use of the fourth information makes it possible to estimate information corresponding to the azimuth and elevation of the transmissive image sensor 60 shown in FIGS. 17C and 17D. Collating the estimated information and the information actually obtained by the transmissive image sensor 60 makes it possible to determine whether the hologram 120 and the medium 300 are authentic.

In the case of verification of the hologram 120 and the medium 300 by using the detection device 71, the change in one or both of the elevation and azimuth of the transmissive image sensor 60 in the detection device 71 can be used as one key element. This provides complexity to the information to be verified.

The foregoing embodiment has components and procedures as described below. Specifically, the detection device 70 and the detection device 71 shown in FIG. 14 and others include the transmissive image sensor 60 capable of measuring light intensity (the image sensor of the present invention) and the point light source LS, and detect, by the transmissive image sensor 60, the first information 41 reconstructed by the hologram 100 and the like, the third information 85 and the like reconstructed by the holograms 120, 130, and the like. The transmissive image sensor 60 can be a one-dimensional image sensor or a two-dimensional image sensor. The transmissive image sensor 60 can be a double-gate image sensor that has pixels formed from double-gate transistor photosensors.

As shown in FIGS. 9A to 9C, the transmissive image sensor 60 is a two-dimensional image sensor or the like that has pixels formed from double-gate thin film transistor photosensors having the top-gate electrode 611 (light-transmissive gate electrode) and the bottom-gate electrode 612 (non-light-transmissive gate electrode) on the insulating substrate 609 (light-transmissive substrate). The pixels are each configured such that the protective insulating film 610 and the top-gate electrode 611 (light-transmissive gate electrode) are arranged in this order on the front surface of the transmissive image sensor 60 facing the hologram 120, 130, or the like, and that the top gate insulating film 605 and the transparent insulating film 604 (insulating films), the semiconductor layer 601 (semiconductor film), the bottom gate insulating film 606 (insulating film), and the bottom gate electrode 612 (non-light-transmissive gate electrode) are arranged in this order from the back surface of the transmissive image sensor 60. The insulating substrate 609 (light-transmissive substrate) is an insulating substrate or the like formed of a thin glass plate. The insulating substrate 609 (light-transmissive substrate) is an insulating substrate or the like formed of a light-transmissive resin film.

In the detection device 71 shown in FIGS. 14A, 14B, and others, the optical axis direction of the point light source LS and the normal direction of the transmissive image sensor 60 (two-dimensional image sensor) with pixels formed from double-gate thin film transistor photosensors are coaxially positioned as shown in FIGS. 10, 12, and others.

In the detection device 71 shown in FIGS. 14A, 14B, and others, two or more transmissive image sensors 60 (two-dimensional image sensors) with pixels formed from double-gate thin film transistor photosensors are laminated as shown in FIG. 12.

The detection device 71 shown in FIGS. 14A, 14B, and others includes the transmissive image sensor 60 (two-dimensional image sensor) and the point light source LS, and detects the light intensity of the point information for reconstructing the first information 81 or the third information 85 from the hologram 130 or the like shown in FIG. 15 by the transmissive image sensor 60 (image sensor), thereby to acquire the position of the point information along the normal direction of the two-dimensional image sensor.

According to the method for verifying authenticity of a hologram in the present embodiment described above with reference to FIGS. 14A, 14B, and others, the detection device 70 or 71 includes the transmissive image sensor 60 (image sensor) capable of measuring light intensity and the point light source LS, the transmissive image sensor 60 (image sensor) is a one-dimensional image sensor or a two-dimensional image sensor with pixels formed from double-gate transistor photosensors, and the detection device 70 or 71 detecting by the transmissive image sensor 60 (image sensor) the first information 81 reconstructed by the hologram 130 or the like shown in FIG. 15 is used to determine whether the first information 81 is authentic via the steps of: acquiring position information of the point information in the first information 81; and comparing the first information 81 acquired by the detection device 70 or 71 with the fourth information used to design the optical phase modulation structure 25 for reconstructing the first information 81. The information detected by the image sensor is part of the information recorded as the hologram 130. Thus, it is hard to obtain information for reconstructing the hologram 130 from the detected information. On the other hand, it is easier to generate information to be detected by the image sensor from the information recorded on the hologram 130. Thus, a person having the information recorded on the hologram 130 can generate the information to be detected by the image sensor and compare the information actually detected by the image sensor with the generated information to verify whether the information detected by the image sensor is authentic.

This prevents counterfeiting of the hologram 130 from the detected information. The reconstruction points of the hologram 130 can be arranged three-dimensionally. This makes it harder to reconstruct the information of the hologram 130 from the detected information.

According to the method for verifying authenticity of a hologram in the present embodiment described above with reference to FIGS. 14A, 14B, and others, the detection device 70 or 71 includes the image sensor 50 capable of measuring intensity and the point light source LS. The image sensor can be the transmissive image sensor 60. The transmissive image sensor 60 can be a one-dimensional image sensor or a two-dimensional image sensor that has pixels formed from double-gate transistor photosensors. The hologram 130 can be authenticated by using the detection device 70 or 71 configured to detect, using the image sensor 50, the third information 85 reconstructed from the hologram 130 as shown in FIG. 15 via the step of verifying the authenticity of the third information 85.

According to the method for verifying authenticity of a hologram in the present embodiment described above with reference to FIGS. 14A, 14B, and others, a detection device 70 or 71 including the image sensor 50 capable of measuring intensity and the point light source LS can be used. The image sensor can be the transmissive image sensor 60. The transmissive image sensor 60 can be a one-dimensional image sensor or a two-dimensional image sensor with pixels formed from double-gate transistor photosensors. The hologram 130 described in FIG. 15 can be authenticated by the use of the detection device 70 or 71 configured to detect by the image sensor 50 the third information 85 reconstructed from the hologram 130 via the steps of: moving one or both of the elevation and azimuth of the image sensor 50 at a specific angle; acquiring by the image sensor 50 the first information 81 or the third information 85 reconstructed from the hologram 130 or the like shown in FIG. 15; computing prediction information obtained by the image sensor 50 from the information of the elevation and azimuth based on the fourth information used to design the optical phase modulation structure 25 for reconstructing the first information; and comparing the prediction information with the first information 81 or the third information 85 obtained by the image sensor 50 to verify authenticity of the information obtained by the image sensor 50 (image sensor).

INDUSTRIAL APPLICABILITY

The hologram according to the present invention makes different the information obtained by a person's visual observation and the information obtained by a reading device such as a detection device. Therefore, the hologram can be applied to provide optical effects for anti-counterfeiting, detection devices, and methods for verifying authenticity, and can be used as a hologram that protects securities, certificates, brand-name goods, high-priced merchandise, electronic devices, and values and information contained in articles such as personal authentication media. Encoding the information added to the hologram as a bar code makes it possible to obtain a mechanical authentication set using a reading device with a photographing function, such as cameras, mobile phones, and smartphones.

The detection device according to the present invention can be miniaturized and thus can be used not only as a detection device for authenticity verification but also as a device for product quality control of holograms at the time of production.

The present invention also allows visual observation of three-dimensional reconstructed information and thus is applicable to purposes other than the anti-counterfeiting described above. For example, the present invention is also applicable to toys, educational tools, decorative accessories of merchandise, posters, and others.

The foregoing embodiments relate to a hologram applied to, for example, a hologram recording optical phase information in space computed in advance by a computer, a detection device that acquires spatial information obtained from the optical phase information, and a method for determining authenticity of the hologram. In addition, the foregoing embodiments relate to a hologram, a detection device, and a method for verifying authenticity of a hologram, which make it easier to acquire reconstructed information from conventional holograms and computer-generated holograms by combination of a light source and a photo-sensitive sensor and acquire three-dimensional spatial distribution information of the reconstructed information. Specifically, according to the foregoing embodiments, it is easier to acquire the three-dimensional spatial distribution information of the reconstructed information from the holograms.

Embodiments of the present invention have been described so far with reference to the drawings. However, specific configurations of the present invention are not limited to these embodiments. The present invention can include designs without deviating from the scope of the present invention and all embodiments producing effects equivalent to those aimed by the present invention.

Further, the scope of the present disclosure is not limited to the features of the invention defined by the claims but includes all disclosed features and combinations of those features.

The terms "part", "element", "pixel", "segment", "unit", "printed matter", and "article" used in the present disclosure denote physical existence. The physical existence can refer to a substantial form or a spatial form surrounded by substances. The physical existence can be a structure. The structure can have a specific function. A combination of structures having specific functions can produce synergistic effects by a combination of the functions of the structures.

The terms used in the present disclosure and, particularly, in the claims (for example, the text of the claims) are generally intended as "open" terms (for example, the term "have" should be interpreted as "at least have", and the term "include" should be interpreted as "include, but not be limited to" or the like).

The terms, configurations, features, aspects, and embodiments should be interpreted with reference to the drawings as necessary. The matter derived directly and uniquely from the drawings should be a basis for amendment on a par with the text.

If the introduction of a specific number in the claims is intended, such an intention should be clearly specified in the claims. If there is not such a specification, the intention does not exist. For example, for the ease of understanding, the accompanying claims allow the use of introductory phrases "at least one" and "one or more" to recite a number of claims. However, the use of such phrases should not be interpreted as meaning that the description in a specific claim with the indefinite article "a" or "an" is limited to one embodiment including the description in the claim. The introductory phrase "one or more" or "at least one" and the indefinite article "a" or "an" (for example, "a" and/or "an") should be interpreted as meaning at least "at least" ("one" or "one or more"). This matter is also applicable to the use of clear articles used for introduction of the claims.

REFERENCE SIGNS LIST

10 Formation layer; 11 Reflection layer; 20, 20a Interface (second interface); 21 Interface (first interface); 30a, 30b, 30c, 30d, 90a, 90b Curved line; 90c Straight line; 40, 40a, 40b, 40c, 42, 80, 82, 84 Reconstruction point; 41, 46, 81 First information; 43, 83 Second information; 85 Third information; 44 Light path; 45, 45a, 45b, 45c Region; 5, 5a, 50 Image sensor; 51 Light-receiving interface; 60, 60a, 60b, 60c, 60d Transmissive image sensor; 61, 61a, 61b, 61c, 61d Light-receiving interface; 62 Transmissive image sensor group; 2, 2a, 70, 71 Detection device; 3, 100, 110, 120, 130 Hologram; 200 Carrier film (base material); 300 Medium (base material); 4, LS Point light source; 601 Semiconductor layer (semiconductor film); 604 Transparent insulating film (insulating film); 605 Top gate insulating film (insulating film); 606 Bottom gate insulating film (insulating film); 609 Insulating substrate (light-transmissive substrate); 611 Top gate electrode (light-transmissive gate electrode); 612 Bottom gate electrode (non-light-transmissive gate electrode).

What is claimed is:

1. A hologram, comprising:
   a formation layer and a reflection layer that are laminated, wherein
   the formation layer has an optical phase modulation structure on a first interface which is in contact with the reflection layer, and,
   when reference light emitted from a point light source enters through a second interface different from the first interface of the formation layer, an entirety or part of an image to be reconstructed by the optical phase modulation structure is reconstructed as first information on the point light source side relative to the second interface, wherein
   the image to be reconstructed by the optical phase modulation structure is reconstructed from a plurality of pieces of point information that constitutes dot-like images, and
   each item of point information is positioned at a predetermined distance from the second interface.

2. The hologram of claim 1, wherein, when the reference light emitted from the point light source enters through the second interface, part of the image to be reconstructed by the optical phase modulation structure is reconstructed as second information on a side of the second interface opposite to that facing the point light source.

3. The hologram of claim 1, wherein
   the first information is reconstructed on a first surface positioned on the point light source side of the second interface, and
   when the reference light emitted from the point light source enters through the second interface, part of the image to be reconstructed by the optical phase modulation structure is reconstructed as third information on the point light source side relative to the second interface and on a second surface that is in proximity to the first surface.

4. A method for verifying authenticity of a hologram, comprising the steps of:
   using a detection device comprising an image sensor capable of measuring light intensity; and a point light source, wherein the image sensor has a two-dimensional image sensor with a pixel formed from a double-gate transistor photosensor;
   acquiring the third information reconstructed from the hologram of claim 3; and,
   detecting whether the third information is true or false to determine authenticity of the hologram.

5. A method for verifying authenticity of a hologram, comprising the steps of:
   using a detection device comprising an image sensor capable of measuring light intensity; and a point light source, wherein the image sensor has a two-dimensional image sensor with a pixel formed from a double-gate transistor photosensor;
   moving one or both of elevation/depression and azimuth of the image sensor at a specific angle;
   acquiring, by the image sensor, the first information or the third information reconstructed from the hologram of claim 3;
   computing, from information of the elevation/depression or azimuth, prediction information obtained by the image sensor based on fourth information used to design a phase modulation structure for reconstructing the first information; and, comparing the first information or the third information obtained by the image sensor with the prediction information; and detecting whether the information obtained by the image sensor is true or false to determine the authenticity of the hologram.

6. The hologram of claim 1, wherein there is an overlap between horizontal positions of all or some of the plurality of pieces of point information for reconstructing the first information relative to the second interface and horizontal positions of all or some of the plurality of pieces of point information for reconstructing the third information relative to the second interface.

7. A detection device, comprising:

an image sensor capable of measuring light intensity; and a point light source, wherein the image sensor has a one-dimensional image sensor or a two-dimensional image sensor with a pixel formed from a photosensor and detects the first information reconstructed by the hologram of claim 1.

8. The detection device of claim 7, wherein the image sensor is the two-dimensional image sensor that has on a light-transmissive substrate the pixel formed from a double-gate thin film transistor photosensor with a light-transmissive gate electrode and a non-light-transmissive gate electrode, and the pixel is configured such that the light-transmissive gate electrode is arranged on a front surface of the image sensor facing the hologram, and an insulating film, a semiconductor film, an insulating film, and the non-light-transmissive gate electrode are arranged in this order from a back surface of the image sensor.

9. The detection device of claim 8, wherein the light-transmissive substrate is an insulating substrate formed of a thin glass plate.

10. The detection device of claim 8, wherein the light-transmissive substrate is formed of a light-transmissive resin film.

11. The detection device of claim 8, wherein an optical axis direction of the point light source and a normal direction of the two-dimensional image sensor with the pixel formed from the double-gate thin film transistor photosensor are coaxially positioned.

12. The detection device of claim 8, wherein two or more two-dimensional image sensors are laminated.

13. A detection device, comprising:

an image sensor capable of measuring light intensity; and a point light source, wherein the image sensor has a two-dimensional image sensor with a pixel formed from a double-gate transistor photosensor and detects the first information or the third information reconstructed by the hologram of claim 1.

14. A detection device, comprising: an image sensor capable of measuring light intensity; and a point light source, wherein the image sensor has a two-dimensional image sensor with a pixel formed from a double-gate transistor photosensor, and the image sensor detects light intensity of the point information for reconstructing the first information or the third information reconstructed by the hologram of claim 1, thereby to acquire positions of the point information along a normal direction of the two-dimensional image sensor.

15. A method for verifying authenticity of a hologram, comprising the steps of: using a detection device that includes an image sensor capable of measuring light intensity and a point light source, the image sensor being formed from a transmissive image sensor with a pixel formed from a photosensor, and is configured to detect, by the image sensor, the first information reconstructed by the hologram of claim 1; acquiring position information of the point information in the first information; comparing the first information acquired by the detection device with fourth information used to design an optical phase modulation structure for reconstructing the first information; and determining whether the first information is correct.

16. A hologram, comprising:

a formation layer and a reflection layer that are laminated, wherein the formation layer has an optical phase modulation structure on a first interface which is in contact with the reflection layer, and, when reference light emitted from a point light source enters through a second interface different from the first interface of the formation layer, an entirety or part of an image to be reconstructed by the optical phase modulation structure is reconstructed as first information on the point light source side relative to the second interface, wherein, when the reference light emitted from the point light source enters through the second interface, part of the image to be reconstructed by the optical phase modulation structure is reconstructed as second information on a side of the second interface opposite to that facing the point light source.

17. A hologram, comprising:

a formation layer and a reflection layer that are laminated, wherein the formation layer has an optical phase modulation structure on a first interface which is in contact with the reflection layer, and, when reference light emitted from a point light source enters through a second interface different from the first interface of the formation layer, an entirety or part of an image to be reconstructed by the optical phase modulation structure is reconstructed as first information on the point light source side relative to the second interface, wherein the first information is reconstructed on a first surface positioned on the point light source side of the second interface, and when the reference light emitted from the point light source enters through the second interface, part of the image to be reconstructed by the optical phase modulation structure is reconstructed as third information on the point light source side relative to the second interface and on a second surface that is in proximity to the first surface.

* * * * *